US010644885B2

(12) United States Patent
Cheng et al.

(10) Patent No.: US 10,644,885 B2
(45) Date of Patent: May 5, 2020

(54) FIRMWARE EXTENSION FOR SECURE CRYPTOCURRENCY KEY BACKUP, RESTORE, AND TRANSACTION SIGNING PLATFORM APPARATUSES, METHODS AND SYSTEMS

(71) Applicant: FMR LLC, Boston, MA (US)

(72) Inventors: Gang Cheng, Nashua, NH (US);
Vladimir Tsitrin, Acton, MA (US);
Thomas Stephen McGuire, Co Galway (IE)

(73) Assignee: FMR LLC, Boston, MA (US)

( * ) Notice: Subject to any disclaimer, the term of this patent is extended or adjusted under 35 U.S.C. 154(b) by 260 days.

(21) Appl. No.: 15/898,224

(22) Filed: Feb. 15, 2018

(65) Prior Publication Data
US 2018/0176013 A1    Jun. 21, 2018

Related U.S. Application Data

(63) Continuation-in-part of application No. 15/456,461, filed on Mar. 10, 2017, now Pat. No. 10,461,940, and
(Continued)

(51) Int. Cl.
*H04L 9/08* (2006.01)
*G06F 21/86* (2013.01)
(Continued)

(52) U.S. Cl.
CPC .......... *H04L 9/0897* (2013.01); *G06F 21/52* (2013.01); *G06F 21/64* (2013.01); *G06F 21/72* (2013.01);
(Continued)

(58) Field of Classification Search
CPC ..... H04L 9/0897; H04L 9/0825; H04L 9/085; G06F 21/52; G06F 21/64; G06F 21/72; G06F 21/85
See application file for complete search history.

(56) References Cited

U.S. PATENT DOCUMENTS 6,959,382 B1 * 10/2005 Kinnis ................. G06F 21/602
713/168
7,921,283 B2 * 4/2011 Hayes ................. H04L 9/3247
713/157
(Continued)

FOREIGN PATENT DOCUMENTS

CA    2870844 A1    5/2015
CA    2843034 A1    8/2015
(Continued)

OTHER PUBLICATIONS

NPL Search (Google Scholar) (Year: 2019).*
Third party submission filed in related U.S. Appl. No. 14/799,242.

*Primary Examiner* — Samson B Lemma
*Assistant Examiner* — Richard W Cruz-Franqui
(74) *Attorney, Agent, or Firm* — Hanchuk Kheit LLP; Walter G. Hanchuk

(57) ABSTRACT

The Firmware Extension for Secure Cryptocurrency Key Backup, Restore, and Transaction Signing Platform Apparatuses, Methods and Systems ("SFTSP") transforms transaction signing request, key backup request, key recovery request inputs via SFTSP components into transaction signing response, key backup response, key recovery response outputs. A key backup request that includes an encrypted master key associated with a hosting HSM is received by a backup HSM from a backup utility. A private key decryption key corresponding to a public key encryption key previously provided by the backup HSM to the backup utility for the hosting HSM is retrieved from the backup HSM's tamper-proof storage and used to decrypt the encrypted master key. A specified number of master key shares to generate for the decrypted master key is determined and generated using a secret sharing method. The generated master key shares are provided to the backup utility.

16 Claims, 24 Drawing Sheets

EXEMPLARY SFTSP ARCHITECTURE

Related U.S. Application Data a continuation-in-part of application No. 15/210,813, filed on Jul. 14, 2016, now abandoned, and a continuation-in-part of application No. 15/210,817, filed on Jul. 14, 2016, and a continuation-in-part of application No. 15/210,807, filed on Jul. 14, 2016, and a continuation-in-part of application No. 15/210,795, filed on Jul. 14, 2016, now abandoned, and a continuation-in-part of application No. 15/210,821, filed on Jul. 14, 2016, now abandoned, and a continuation-in-part of application No. 14/799,282, filed on Jul. 14, 2015, now abandoned, and a continuation-in-part of application No. 14/799,242, filed on Jul. 14, 2015, now abandoned, and a continuation-in-part of application No. 14/799,229, filed on Jul. 14, 2015, now abandoned, and a continuation-in-part of application No. 14/963,165, filed on Dec. 8, 2015, now Pat. No. 10,504,179, and a continuation-in-part of application No. 15/019,926, filed on Feb. 9, 2016, now abandoned, and a continuation-in-part of application No. 15/209,701, filed on Jul. 13, 2016, now abandoned, and a continuation-in-part of application No. 15/209,709, filed on Jul. 13, 2016, and a continuation-in-part of application No. 15/209,714, filed on Jul. 13, 2016, now Pat. No. 10,339,523, and a continuation-in-part of application No. 15/210,781, filed on Jul. 14, 2016, and a continuation-in-part of application No. 15/486,243, filed on Apr. 12, 2017.

(60) Provisional application No. 62/273,447, filed on Dec. 31, 2015, provisional application No. 62/273,449, filed on Dec. 31, 2015, provisional application No. 62/273,450, filed on Dec. 31, 2015, provisional application No. 62/273,452, filed on Dec. 31, 2015, provisional application No. 62/273,453, filed on Dec. 31, 2015.

(51) Int. Cl.
  *G06F 21/64* (2013.01)
  *G06F 21/72* (2013.01)
  *G06F 21/52* (2013.01)

(52) U.S. Cl.
  CPC .............. *G06F 21/86* (2013.01); *H04L 9/085* (2013.01); *H04L 9/0825* (2013.01)

(56) References Cited

U.S. PATENT DOCUMENTS

| | | | |
|---|---|---|---|
| 9,076,290 | B2 | 7/2015 | Griffin |
| 9,082,113 | B2 | 7/2015 | Shea et al. |
| 9,087,326 | B2 | 7/2015 | Shea et al. |
| 9,098,190 | B2 | 8/2015 | Zhou |
| 9,098,387 | B1 | 8/2015 | Curtis et al. |
| 9,098,874 | B2 | 8/2015 | Chandra et al. |
| 9,117,341 | B2 | 8/2015 | Marantelli |
| 9,122,749 | B2 | 9/2015 | Elmore et al. |
| 9,129,338 | B2 | 9/2015 | Liu |
| 9,129,339 | B2 | 9/2015 | Liu |
| 9,135,616 | B2 | 9/2015 | Hirson et al. |
| 9,135,787 | B1 | 9/2015 | Russell |
| 9,144,742 | B1 | 9/2015 | Curtis et al. |
| 9,153,088 | B2 | 10/2015 | Spencer, II |
| 9,160,717 | B2 | 10/2015 | Bhanoo et al. |
| 9,407,617 | B2 * | 8/2016 | Mowers .............. H04L 63/0807 |
| 2003/0191709 | A1 | 10/2003 | Elston |
| 2003/0217258 | A1 * | 11/2003 | Bade .................. H04L 63/0442 713/150 |
| 2005/0138374 | A1 * | 6/2005 | Zheng .................. H04L 9/0894 713/166 |
| 2007/0215695 | A1 | 9/2007 | Trane |
| 2008/0271144 | A1 * | 10/2008 | Bleumer ............... G06F 21/445 726/22 |
| 2009/0077374 | A1 * | 3/2009 | Schwarz ............ G06Q 20/3829 713/156 |
| 2009/0106125 | A1 | 4/2009 | Rock |
| 2013/0129080 | A1 * | 5/2013 | Tang ..................... H04L 9/0816 380/28 |
| 2014/0052994 | A1 * | 2/2014 | Sabin ..................... H04L 9/3247 713/176 |
| 2014/0074497 | A1 | 3/2014 | Griffin |
| 2014/0095865 | A1 * | 4/2014 | Yerra ..................... H04L 9/3265 713/156 |
| 2014/0095878 | A1 * | 4/2014 | Shimano ............... H04L 9/0897 713/171 |
| 2014/0114861 | A1 * | 4/2014 | Mages .................. G07F 7/0886 705/71 |
| 2015/0018084 | A1 | 1/2015 | Gatto |
| 2015/0195099 | A1 | 7/2015 | Imes |
| 2015/0205929 | A1 | 7/2015 | Brama |
| 2015/0206106 | A1 | 7/2015 | Yago |
| 2015/0206240 | A1 | 7/2015 | Baker |
| 2015/0213008 | A1 | 7/2015 | Orsini et al. |
| 2015/0213351 | A1 | 7/2015 | Wyatt |
| 2015/0213419 | A1 | 7/2015 | Lyons et al. |
| 2015/0213437 | A1 | 7/2015 | Wyatt |
| 2015/0220892 | A1 | 8/2015 | Allen |
| 2015/0220928 | A1 | 8/2015 | Allen |
| 2015/0227897 | A1 | 8/2015 | Loera |
| 2015/0227898 | A1 | 8/2015 | Ballout |
| 2015/0227913 | A1 | 8/2015 | Ballout |
| 2015/0245084 | A1 | 8/2015 | Downing et al. |
| 2015/0248672 | A1 | 9/2015 | Bayer |
| 2015/0254640 | A1 | 9/2015 | Cassano et al. |
| 2015/0254768 | A1 | 9/2015 | Menon et al. |
| 2015/0261269 | A1 | 9/2015 | Bruscoe |
| 2015/0262137 | A1 | 9/2015 | Armstrong |
| 2015/0262138 | A1 | 9/2015 | Hudon |
| 2015/0262139 | A1 | 9/2015 | Shtylman |
| 2015/0262140 | A1 | 9/2015 | Armstrong |
| 2015/0262141 | A1 | 9/2015 | Rebernik et al. |
| 2015/0262168 | A1 | 9/2015 | Armstrong |
| 2015/0262171 | A1 | 9/2015 | Langschaedel et al. |
| 2015/0262172 | A1 | 9/2015 | Rebernik |
| 2015/0262173 | A1 | 9/2015 | Durbin et al. |
| 2015/0262176 | A1 | 9/2015 | Langschaedel et al. |
| 2015/0262251 | A1 | 9/2015 | Knobel |
| 2015/0269538 | A1 | 9/2015 | Stanchfield |
| 2015/0269539 | A1 | 9/2015 | MacGregor et al. |
| 2015/0269541 | A1 | 9/2015 | MacGregor et al. |
| 2015/0269570 | A1 | 9/2015 | Phan |
| 2015/0271183 | A1 | 9/2015 | MacGregor et al. |
| 2015/0278820 | A1 | 10/2015 | Meadows |
| 2015/0286995 | A1 | 10/2015 | Korosec |
| 2015/0287026 | A1 | 10/2015 | Yang et al. |
| 2015/0294308 | A1 | 10/2015 | Pauker et al. |
| 2015/0294424 | A1 | 10/2015 | Hakim |
| 2015/0294425 | A1 | 10/2015 | Benson |
| 2015/0302357 | A1 | 10/2015 | Chandra |
| 2015/0302400 | A1 | 10/2015 | Metral |
| 2015/0302401 | A1 | 10/2015 | Metral |
| 2015/0302441 | A1 | 10/2015 | Katsuyama et al. |
| 2015/0302446 | A1 | 10/2015 | Park et al. |
| 2015/0358161 | A1 * | 12/2015 | Kancharla .......... H04L 63/0485 713/164 |
| 2016/0019522 | A1 | 1/2016 | Granbery |
| 2016/0085955 | A1 * | 3/2016 | Lerner .................... G06F 21/31 726/20 |
| 2016/0119318 | A1 * | 4/2016 | Zollinger ............. H04L 9/0819 713/171 |
| 2016/0162897 | A1 * | 6/2016 | Feeney ............. G06Q 20/4014 705/71 |
| 2016/0210632 | A1 | 7/2016 | Li |

(56) References Cited

U.S. PATENT DOCUMENTS

2016/0269182 A1* 9/2016 Sriram .................. H04L 9/3242
2017/0357496 A1* 12/2017 Smith ....................... G06F 8/65

FOREIGN PATENT DOCUMENTS

| | | |
|---|---|---|
| CA | 2845648 A1 | 9/2015 |
| EP | 2820797 A1 | 1/2015 |
| EP | 2831823 A1 | 2/2015 |
| EP | 2874112 A1 | 5/2015 |
| EP | 2896001 A1 | 7/2015 |
| WO | 2008065345 A1 | 6/2008 |
| WO | 2012142521 A2 | 10/2012 |
| WO | 2013078990 A1 | 6/2013 |
| WO | 2014201059 A1 | 12/2014 |
| WO | 2015004820 A1 | 1/2015 |
| WO | 2015016356 A1 | 2/2015 |
| WO | 2015024129 A1 | 2/2015 |
| WO | 2015051692 A1 | 4/2015 |
| WO | 2015058282 A1 | 4/2015 |
| WO | 2015059669 A1 | 4/2015 |
| WO | 2015077378 A1 | 5/2015 |
| WO | 2015085393 A1 | 6/2015 |
| WO | 2015095761 A1 | 6/2015 |
| WO | 2015106285 A1 | 7/2015 |
| WO | 2015113519 A1 | 8/2015 |
| WO | 2015116998 A2 | 8/2015 |
| WO | 2015120606 A1 | 8/2015 |
| WO | 2015134890 A1 | 9/2015 |
| WO | 2015135018 A1 | 9/2015 |
| WO | 2015142765 A1 | 9/2015 |
| WO | 2015143068 A1 | 9/2015 |
| WO | 2015144971 A1 | 10/2015 |
| WO | 2015148725 A2 | 10/2015 |
| WO | 2016025990 | 2/2016 |

* cited by examiner

EXEMPLARY SFTSP DEPLOYMENT DIAGRAM

EXEMPLARY SFTSP SECURE FIRMWARE TRANSACTION SIGNING (SFTS) COMPONENT

FIGURE 8 — EXEMPLARY SFTSP AUTHENTICATION MODEL

EXEMPLARY SFTSP KEY BACKUP MODEL

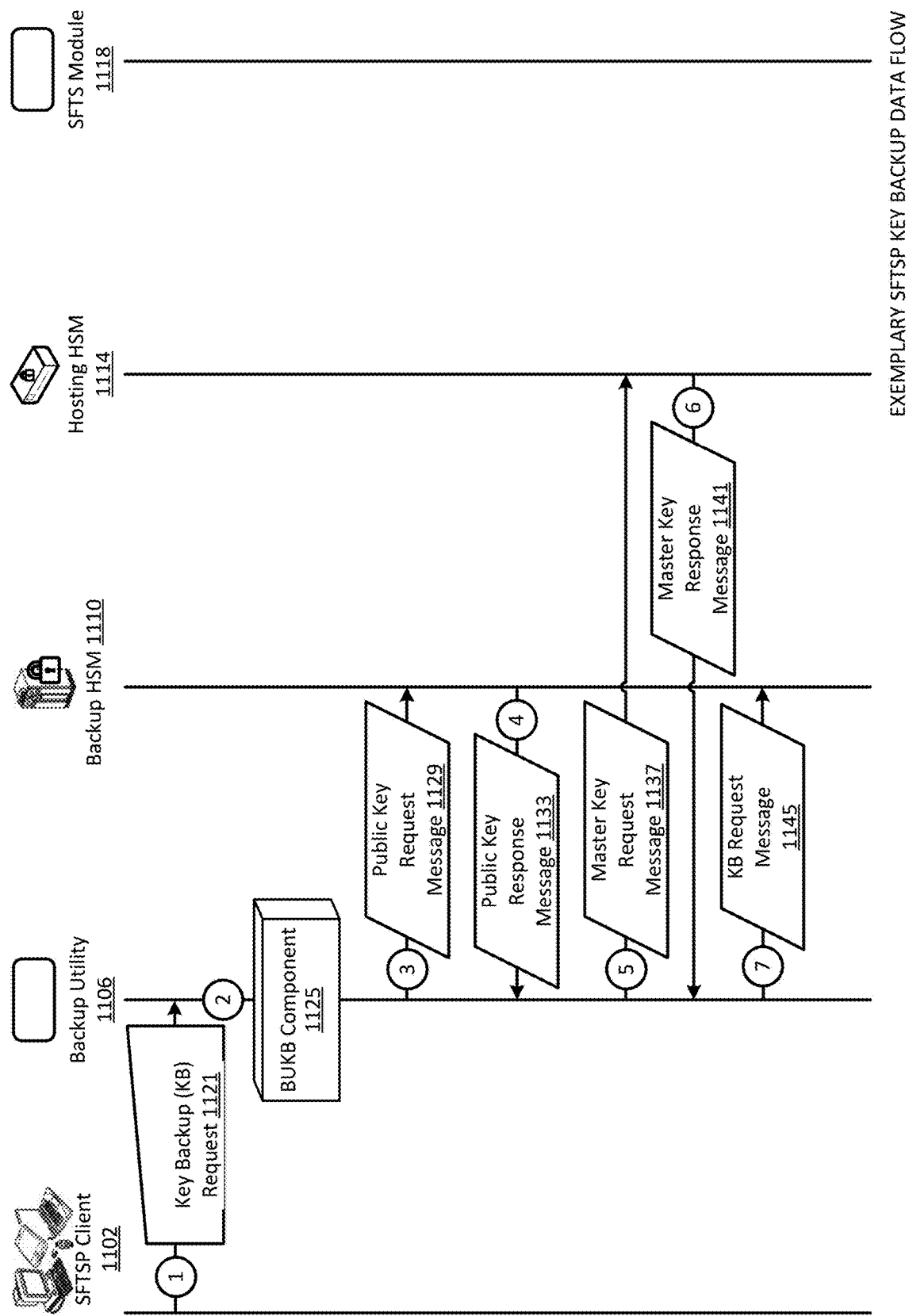

EXEMPLARY SFTSP BACKUP UTILITY KEY BACKUP (BUKB) COMPONENT

EXEMPLARY SFTSP SECURE FIRMWARE KEY BACKUP (SFKB) COMPONENT

| Secret Share Name: | SEED_SSHARE_KS003_HW_1_0 |
|---|---|
| Keyset ID: | KS003 |
| Wallet Type: | HOT |
| Seed Index: | 1 |
| Secret Share Index: | 0 |

EXEMPLARY SFTSP SCREENSHOT

EXEMPLARY SFTSP SEED SHARES GEOGRAPHIC DISTRIBUTION MODEL

FIGURE 17

EXEMPLARY SFTSP SCREENSHOT

```
>Keygen.bat
################################################################
# Printing key shares for paper backup...
################################################################
SEED_KS001_SHARE_0 is being printed ...
Operator1>Package and validate SEED_KS001_SHARE_0 and press enter to continue: <Enter>
SEED_KS001_SHARE_1 is being printed ...
Operator2>Package and validate SEED_KS001_SHARE_1 and press enter to continue: <Enter>
SEED_KS001_SHARE_2 is being printed ...
Operator3>Package and validate SEED_KS001_SHARE_2 and press enter to continue: <Enter>
SEED_KS001_SHARE_3 is being printed ...
Operator4>Package and validate SEED_KS001_SHARE_3 and press enter to continue: <Enter>
```

EXEMPLARY SFTSP RECOVERY UTILITY KEY RECOVERY (RUKR) COMPONENT

EXEMPLARY SFTSP SECURE FIRMWARE KEY RECOVERY (SFKR) COMPONENT

FIGURE 22

```
>Keyrecover.bat

###################################################################
# Recovering key materials from backup shares...
###################################################################

Recovering seed SEED_KS001_1

Entering secret share 1 out of 2...

Operator1> Enter secret share index: 0

Operator1> Enter secret share value:
0738D75A7D658586E88FBFBC207D7DB3EA16D59D086046D2A8420089A3E857FFC831B57B0F3649E897B
F28F48EF278EE8D4AA1FE123E85C5A6E5ADA67D82AE2A2DB Operator2> Enter secret share index again: 0

Operator2> Enter secret share value again:
0738D75A7D658586E88FBFBC207D7DB3EA16D59D086046D2A8420089A3E857FFC831B57B0F3649E897B
F28F48EF278EE8D4AA1FE123E85C5A6E5ADA67D82AE2A2DB Entering secret share 2 out of 2...

Operator1> Enter secret share index: 1

Operator1> Enter secret share value:
CB1CDCD5988C8A2720 58D659FB8E9C6D2F899A01F39368 8A26AB01C8C6E63AB2C2B179ED2D0A3E21
34964 2576AFB0E890B D3F57351 27D04DC4F2BD 8737C601212

Operator2> Enter secret share index again: 1

Operator2> Enter secret share value again:
CB1CDCD5988C8A2720 58D659FB8E9C6D2F899A01F39368 8A26AB01C8C6E63AB2C2B179ED2D0A3E21
34964 2576AFB0E890B D3F57351 27D04DC4F2BD 8737C601212

Generating secret shares for seed: SEED_KS001_1

Validating secret shares for seed: SEED_KS001_1
```

EXEMPLARY SFTSP SCREENSHOT

FIRMWARE EXTENSION FOR SECURE CRYPTOCURRENCY KEY BACKUP, RESTORE, AND TRANSACTION SIGNING PLATFORM APPARATUSES, METHODS AND SYSTEMS

PRIORITY CLAIM

Applicant hereby claims benefit to priority under 35 USC § 120 as a continuation-in-part of: U.S. patent application Ser. No. 15/456,461 filed Mar. 10, 2017, entitled "Secure Firmware Transaction Signing Platform Apparatuses, Methods and Systems".

Applicant hereby claims benefit to priority under 35 USC § 120 as a continuation-in-part of: U.S. patent application Ser. No. 15/210,813, filed Jul. 14, 2016, entitled "Crypto Key Recovery and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems,".

Applicant hereby claims benefit to priority under 35 USC § 120 as a continuation-in-part of: U.S. patent application Ser. No. 15/210,817, filed Jul. 14, 2016, entitled "Crypto Voting and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,807, filed Jul. 14, 2016, entitled "Smart Rules and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,795, filed Jul. 14, 2016, entitled "Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273, 449, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems,"U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 15/210,821, filed Jul. 14, 2016, entitled "Crypto Captcha and Social Aggregating, Fractionally Efficient Transfer Guidance, Conditional Triggered Transaction, Datastructures, Apparatuses, Methods and Systems"; and which in turn claims benefit to priority under 35 USC § 119 as a non-provisional conversion of: U.S. provisional patent application Ser. No. 62/273,447, filed Dec. 31, 2015, entitled "Social Aggregating, Fractionally Efficient Transfer Guidance, Conditional Triggered Transaction, Datastructures, Apparatuses, Methods and Systems", U.S. provisional patent application Ser. No. 62/273,449, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,450, filed Dec. 31, 2015, entitled "Social Aggregating, Fractionally Efficient Transfer Guidance, Conditional Triggered Transaction, Datastructures, Apparatuses, Methods and Systems,", U.S. provisional patent application Ser. No. 62/273,452, filed Dec. 31, 2015, entitled "Social Aggregating, Fractionally Efficient Transfer Guidance, Conditional Triggered Transaction, Datastructures, Apparatuses, Methods and Systems, ", U.S. provisional patent application Ser. No. 62/273,453, filed Dec. 31, 2015, entitled "Social Aggregating, Fractionally Efficient Transfer Guidance, Conditional Triggered Transaction, Datastructures, Apparatuses, Methods and Systems".

Applicant hereby claims benefit to priority under 35 USC § 120 as a continuation-in-part of: U.S. patent application Ser. No. 14/799,282, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/799,242, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/799,229, filed Jul. 14, 2015, entitled "Point-to-Point Transaction Guidance Apparatuses, Methods and Systems".

Applicant hereby claims benefit to priority under 35 USC § 120 as a continuation-in-part of: U.S. patent application Ser. No. 14/963,165, filed Dec. 8, 2015, entitled "Social Aggregated Fractional Equity Transaction Partitioned Acquisition Apparatuses, Methods and Systems".

Applicant hereby claims benefit to priority under 35 USC § 120 as a continuation-in-part of: U.S. patent application Ser. No. 15/019,926, filed Feb. 9, 2016, entitled "Computationally Efficient Transfer Processing and Auditing Apparatuses, Methods and Systems".

Applicant hereby claims benefit to priority under 35 USC § 120 as a continuation-in-part of: U.S. patent application Ser. No. 15/209,701, filed Jul. 13, 2016, entitled "Point-to-Point Transaction Guidance Apparatuses, Methods and Systems".

Applicant hereby claims benefit to priority under 35 USC § 120 as a continuation-in-part of: U.S. patent application Ser. No. 15/209,709, filed Jul. 13, 2016, entitled "Point-to-Point Transaction Guidance Apparatuses, Methods and Systems".

Applicant hereby claims benefit to priority under 35 USC § 120 as a continuation-in-part of: U.S. patent application Ser. No. 15/209,714, filed Jul. 13, 2016, entitled "Point-to-Point Transaction Guidance Apparatuses, Methods and Systems".

Applicant hereby claims benefit to priority under 35 USC § 120 as a continuation-in-part of: Patent Cooperation Treaty application serial no. PCT/US16/42169, filed Jul. 13, 2016, entitled "Computationally Efficient Transfer Processing, Auditing, and Search Apparatuses, Methods and Systems".

Applicant hereby claims benefit to priority under 35 USC § 120 as a continuation-in-part of: U.S. patent application Ser. No. 15/210,781, filed Jul. 14, 2016, entitled "Computationally Efficient Transfer Processing, Auditing, and Search Apparatuses, Methods and Systems".

Applicant hereby claims benefit to priority under 35 USC § 120 as a continuation-in-part of: U.S. patent application Ser. No. 15/486,243, filed Apr. 12, 2017, entitled "Computationally Efficient Transfer Processing, Auditing, and Search Apparatuses, Methods and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Firmware Extension for Secure Cryptocurrency Key Backup, Restore, and Transaction Signing Platform Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Bitcoin is an open source software application and a shared protocol. It allows users to anonymously and instantaneously transact Bitcoin, a digital currency, without needing to trust counterparties or separate intermediaries. Bitcoin achieves this trustless anonymous network using public/private key pairs, a popular encryption technique.

BRIEF DESCRIPTION OF THE DRAWINGS

Appendices and/or drawings illustrating various, non-limiting, example, innovative aspects of the Firmware Extension for Secure Cryptocurrency Key Backup, Restore, and Transaction Signing Platform Apparatuses, Methods and Systems (hereinafter "SFTSP") disclosure, include:

FIGS. 11A-B show a datagraph diagram illustrating embodiments of a data flow for the SFTSP;

FIG. 17 shows a screenshot diagram illustrating embodiments of the SFTSP;

FIG. 22 shows a screenshot diagram illustrating embodiments of the SFTSP; and

Figure 1:
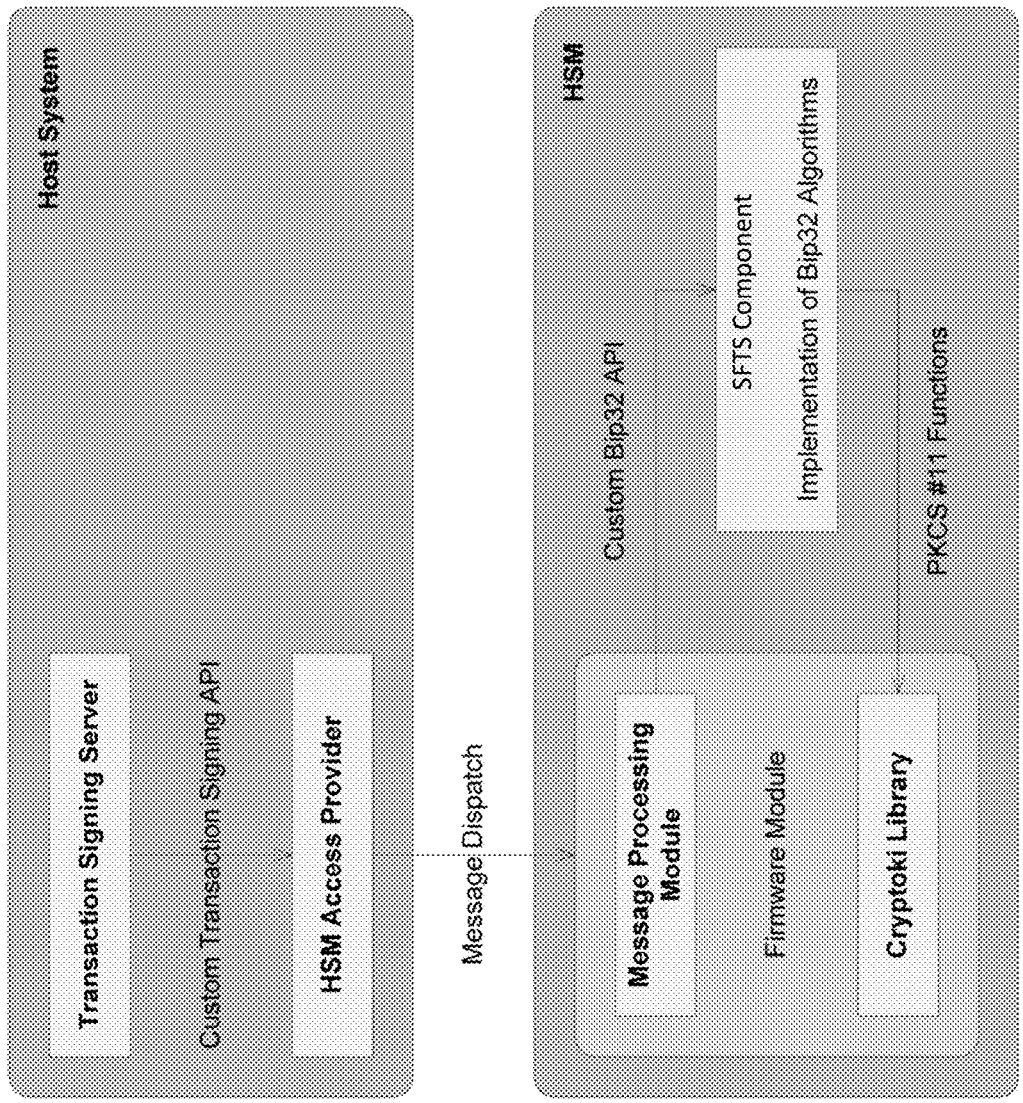
FIG. 1 shows an exemplary architecture for the SFTSP.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Firmware Extension for Secure Cryptocurrency Key Backup, Restore, and Transaction Signing Platform Apparatuses, Methods and Systems (hereinafter "SFTSP") transforms transaction signing request, key backup request, key recovery request inputs, via SFTSP components (e.g., SFTS, BUKB, SFKB, RUKR, SFKR, etc. components), into transaction signing response, key backup response, key recovery response outputs. The SFTSP components, in various embodiments, implement advantageous features as set forth below.

Introduction

Cryptocurrency (e.g., Bitcoin) funds and appropriate operations on them are intrinsically linked to asymmetric cryptography keys: funds are received at addresses based on public keys and spent using private keys that confirm ownership. Non-trivial Bitcoin wallet implementations operate multiple keys for the following reasons:

a) Operations are published on the Blockchain and become publicly visible b) Reuse of receiving addresses allows data analysis that leads to identification of actively used addresses with significant funds and compromises the privacy of cryptocurrency transactions c) An enterprise-hosted wallet structure usually utilizes different accounts for different organizational units and for different purposes The use of independent keys for each operation, purpose, or organizational unit, aka flat wallets, makes both backing up keys and securing keys very complicated. In order to address this issue, Bitcoin improvement proposal #32 (Bip32) describes a deterministic algorithm that allows the building of a tree of private/public key pairs from a single secret seed (e.g., master key) and allows creation and management of hierarchical deterministic wallets instead of flat ones. Accordingly, by following Bip32:

a) Mapping of addresses for organizational units, particular operations, or purposes to transaction signing keys is done in a predictable manner b) Securing of persistent keys is reduced to securing the seed c) Backup and recovery procedures are simplified because the whole hierarchy of keys can be restored from the seed A reliable way (e.g., one of the most secure ways) to store information (e.g., crypto keys) securely is inside a FIPS 140-2-certified hardware security module (HSM) appliance that provides tamper-proof storage of sensitive information. There is no external access to the dynamic memory inside a HSM, and, in some implementations, any attempts to physically access the tamper-proof storage may trigger complete deletion of stored information.

Current industry implementations of wallet and key management systems for secure wallets utilize a (e.g., software-based) Transaction Signing Server (TSS) to implement key derivation and transaction signing procedures. This creates a security threat because private keys, including the master key, are created in TSS memory, where, as the memory of a TSS server does not have strict physical boundaries, they can be stolen by an attacker. Multiple known memory attacks, such as Direct Memory Access (e.g., steal sensitive information directly from the memory) and Core Dump (e.g., cause a system crash and steal information from the memory dump generated during the crash) exist, and, despite existing protective measures and practices, the risk of private keys being stolen from the TSS memory (e.g., by malicious insiders) remains high. Additionally, as there is no reliable way to identify such unauthorized memory access and key theft, keys may be stolen and used at a later time when fund losses associated with those keys are significant.

Further, as cryptographic funds are tightly coupled with cryptographic keys, the loss or theft of keys is identical to the loss of funds. In case of hierarchical deterministic wallets, loss or theft of seeds is identical to the loss or theft of funds associated with keys that can be derived from these seeds. This means that seeds should be backed up reliably and securely. Even though multiple backup copies of HSM devices storing seeds may be created, it is desirable to have distributed hard copies of keys (e.g., paper printouts, metal engravings), which provide means to recover keys in case of severe disasters when not only HSM devices but whole data centers may become unavailable. Regular hardcopies of seeds suffer from the following weaknesses:

a) If stolen, they provide full seeds to an attacker b) In order to be printed, seeds are extracted from HSMs into a computer's memory in the plain text format and can be stolen using memory targeting attacks c) While being recovered from hard copies, seeds are processed in a computer's memory in the plain text format and can be stolen using memory targeting attacks d) While being distributed from one location to another or recovered from hard copies, seeds can be copied and even memorized by the operational staff Thus, even though seeds or private keys may not be exposed outside of HSM during regular cryptographic operations, during key generation, key backup and restore operations, since master seeds have to exist outside of HSM for a period of time before being deposited into bank safety box for safe backup store, there exist attack vectors and seed materials can be compromised.

SFTSP

FIG. 1 shows an exemplary architecture for the SFTSP. In FIG. 1, a TSS utilizes a custom transaction signing API via a HSM Access Provider (e.g., a module used to communicate with a HSM) to request transaction signing by a HSM (e.g., Gemalto's SafeNet HSM). The HSM may receive such requests via a message processing module of the HSM's firmware, and respond with signed transactions.

The HSM's firmware module is extended to include a secure firmware transaction signing (SFTS) module, which includes a SFTS component and/or other components (e.g., SFKB, SFKR) and an implementation of Bip32 algorithms. In some implementations, the SFTS module may utilize PKCS#11 API (e.g., via a Cryptoki Library) for message signing and hash generation. In some implementations, the SFTS module may implement high precision mathematical operations either ad hoc or using open source libraries (e.g., OpenSSL). In one embodiment, utilizing an HSM extended with a SFTS module to implement key derivation and transaction signing procedures improves security of hierarchical deterministic wallets.

Figure 2:
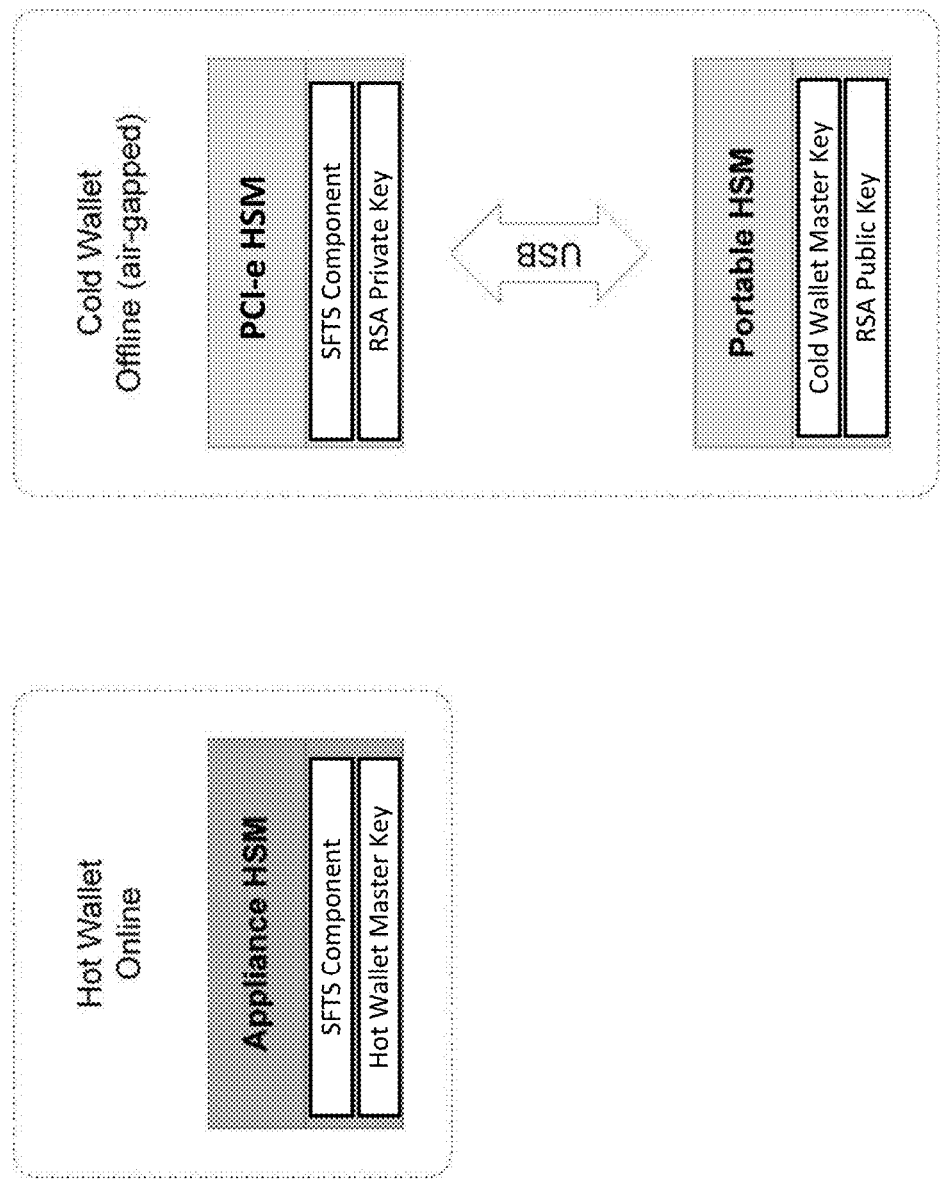
FIG. 2 shows an exemplary deployment diagram for the SFTSP.

FIG. 2 shows an exemplary deployment diagram for the SFTSP. In FIG. 2, a deployment diagram for hot and cold storages of funds (e.g., wallets) is shown. A hot wallet (e.g., holding a small amount of funds for online purchases) is using an online network appliance HSM hosting both a hot wallet master private key and a SFTS component. A cold wallet (e.g., holding the majority of funds offline), is using an offline (e.g., PCI-e) HSM hosting a SFTS component and a RSA private key used for decrypting a cold wallet master private key share retrieved from a portable HSM. The portable (e.g., USB-connected) HSM hosts one share of the cold wallet master private key and the RSA public key matching the RSA private key stored in the offline (e.g., PCI-e) HSM.

In some embodiments, the SFTSP may protect addresses used for receiving funds in transactions between paired cold and hot wallets. These addresses are derived from master keys in a similar way as the derivation of private keys used for transaction signing. Accordingly, these addresses may be protected if transaction composition code uses addresses generated directly from a HSM to transfer funds between cold and hot wallets.

Figure 3:
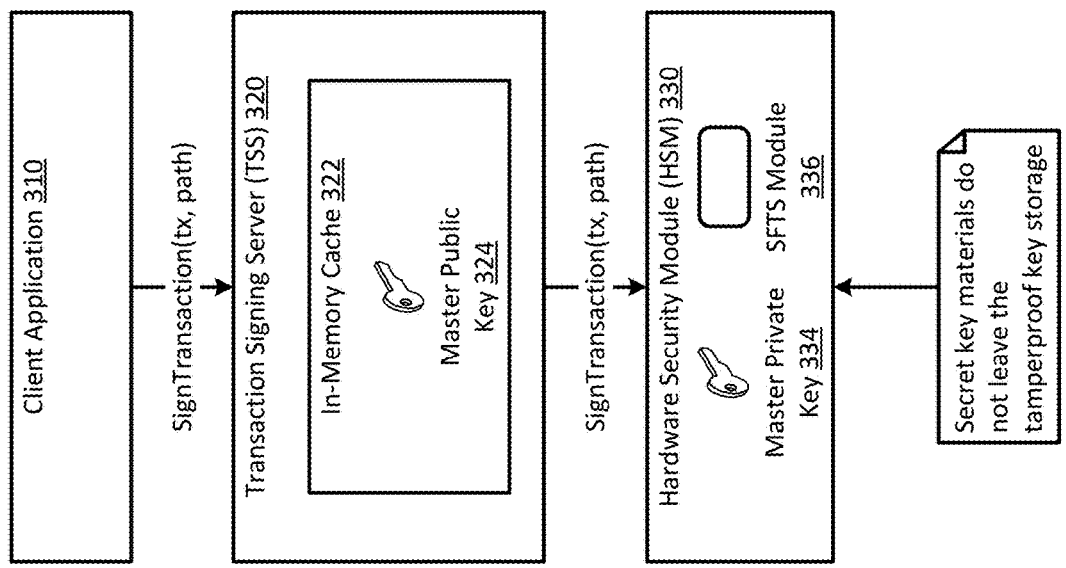
FIG. 3 shows an exemplary single HSM use case for the SFTSP.

FIG. 3 shows an exemplary single HSM use case for the SFTSP. For example, this use case may be utilized for a hot wallet. In FIG. 3, a client application 310 (e.g., utilized by a user via a client device) may send a transaction signing request (e.g., including transaction data to sign and a key-chain path to be used for Bip32 key derivation) to a TSS 320. The TSS may include an in-memory cache 322 that stores a master public key 324. For example, the TSS may provide the master public key to the client application, if requested.

The TSS may forward the transaction signing request to a HSM 330. For example, the HSM may be a network-attached HSM. The HSM's tamper-proof storage (e.g., the HSM's firmware) may store a master private key (e.g., an ECDSA private key) 334 and a SFTS module 336. The HSM may utilize the master private key and the SFTS module to sign the transaction, and may respond with a signed transaction (e.g., ECDSA signature in Distinguished Encoding Rules (DER) format). Sensitive operations, such as key derivation and transaction signing, are implemented inside the HSM appliance and master secret key materials do not leave the tamper-proof storage. Tamper-proof storage ensures that secret information is inaccessible to an attacker and that any attempted attack is detected and reported to the appropriate operational group.

Figure 4:
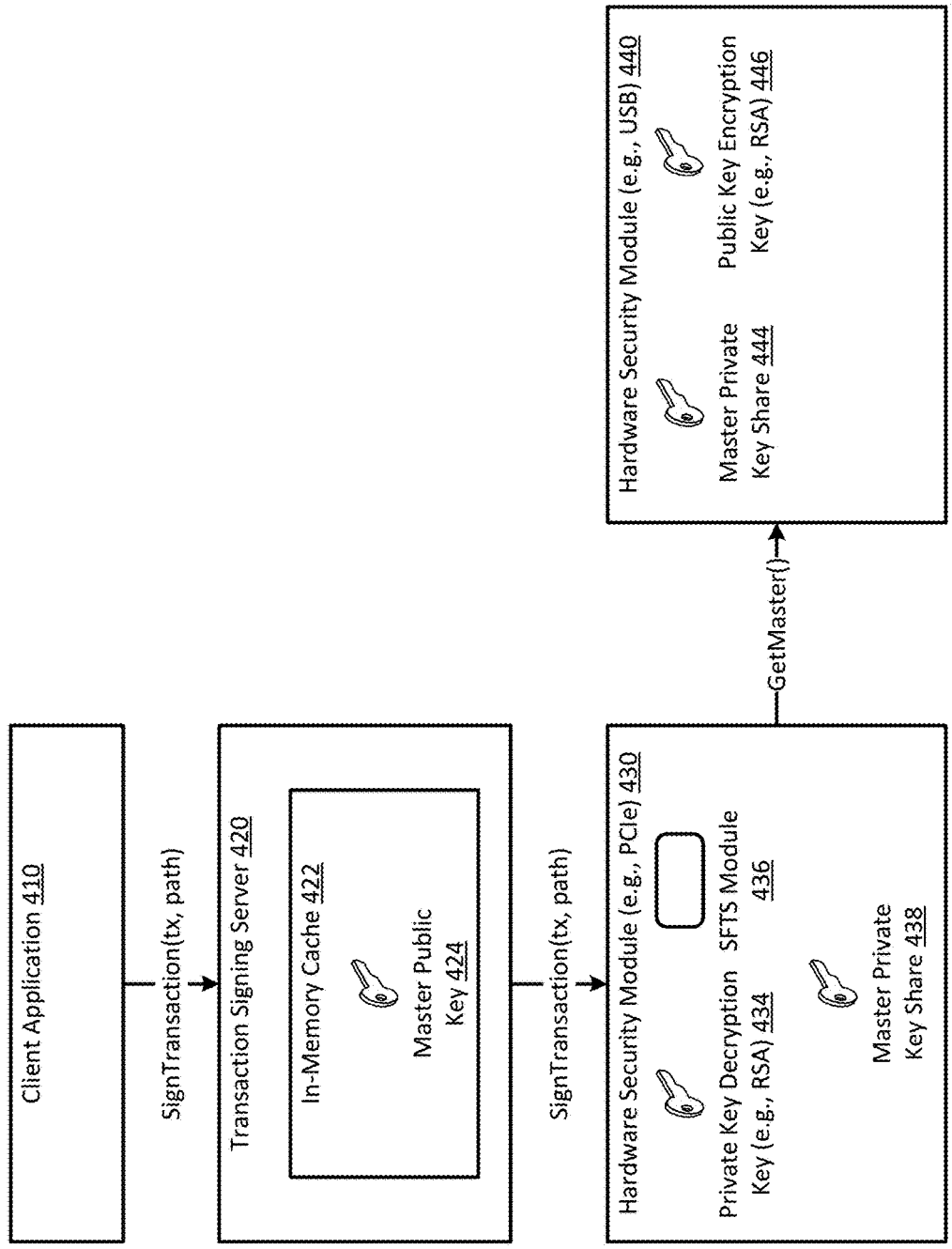
FIG. 4 shows an exemplary dual HSM use case for the SFTSP.

FIG. 4 shows an exemplary dual HSM use case for the SFTSP. For example, this use case may be utilized for a cold wallet. In FIG. 4, a client application 410 (e.g., utilized by a user via a client device) may send a transaction signing request (e.g., including transaction data to sign and a key-chain path to be used for Bip32 key derivation) to a TSS 420. The TSS may include an in-memory cache 422 that stores a master public key 424. For example, the TSS may provide the master public key to the client application, if requested.

The TSS may forward the transaction signing request to a first HSM 430. For example, the first HSM may be a PCIe HSM (e.g., installed in a TSS (e.g., machine)). The first HSM's tamper-proof storage (e.g., the first HSM's firmware) may store a private key decryption key (e.g., an RSA private key) 434, a master private key share (e.g., an ECDSA private key share) 438 and a SFTS module 436.

The first HSM may send a get master request to a second HSM 440. For example, the second HSM may be a portable USB HSM. The second HSM's tamper-proof storage (e.g., the second HSM's firmware) may store a master private key share (e.g., an ECDSA private key share) 444 and a public key encryption key (e.g., an RSA public key that corresponds to the RSA private key stored in the first HSM's tamper-proof storage) 446. In one embodiment, the second HSM may include a split credentials PIN entry device (PED) to provide for multiple-person (e.g., M-of-N) user access rule for HSM activation and/or operation (e.g., 2-of-3 operation enforcement that allows access to the master private key if at least two out of three people provide their separate credentials to the second HSM). See FIGS. 8 and 9 for additional details regarding M-of-N authentication.

The second HSM may encrypt the master private key share using the public key encryption key (e.g., associated with the first HSM), and may respond to the get master request by returning the encrypted master private key share to the first HSM. The first HSM may decrypt the master private key share using the private key decryption key, may utilize the decrypted master private key share, the other master private key share(s) and the SFTS module to sign the transaction, and may respond with a signed transaction (e.g., ECDSA signature in DER format). Sensitive operations, such as key derivation and transaction signing, are implemented inside the first HSM appliance and secret key materials are encrypted when transferred between the two HSMs.

Figure 5:
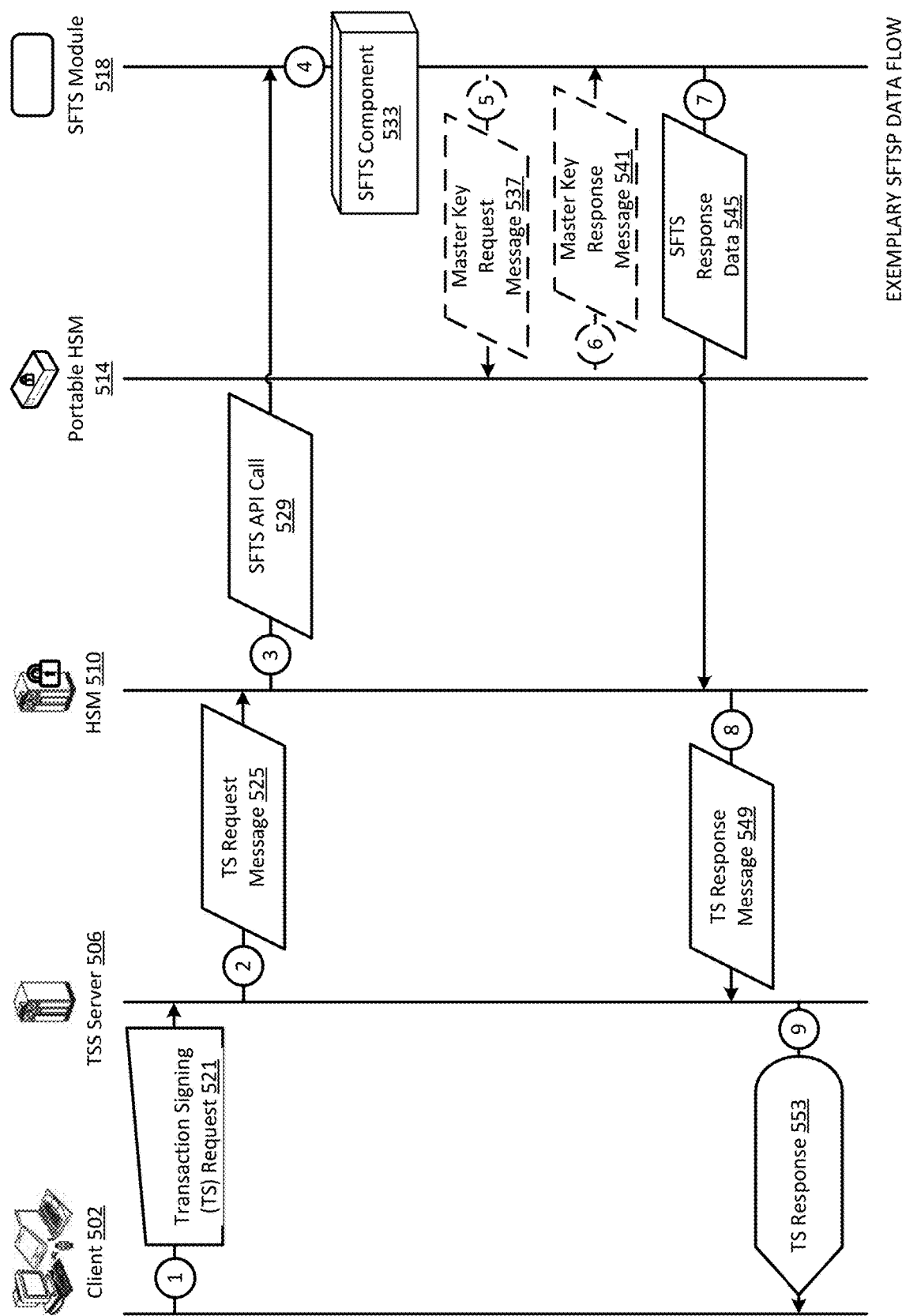
FIG. 5 shows a datagraph diagram illustrating embodiments of a data flow for the SFTSP.

FIG. 5 shows a datagraph diagram illustrating embodiments of a data flow for the SFTSP. In FIG. 5, dashed lines indicate data flow elements that may be more likely to be optional. In FIG. 5, a client 502 may send a transaction signing (TS) request 521 to a TSS server 506 to request that a transaction be signed. For example, the client may be an air-gapped desktop, a laptop, a tablet, a smartphone, and/or the like that is executing a client application. In one implementation, the TS request may include data such as a request identifier, user authentication data, a request type (e.g., sign message hash, get address hash), a wallet identifier, a transaction identifier, a transaction hash, a keychain path, and/or the like. In one embodiment, the client may provide the following example TS request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: localhost
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeD000e@gmail.com</
            account_name>
            <password>abc123</password>
            //OPTIONAL <cookie>cookieID</cookie>
            //OPTIONAL <digital_cert_link>
            www.mydigitalcertificate.com/
JohnDoeDaDoeDoe@gmail.com/mycertifcate.dc</digital_cert_link>
            //OPTIONAL <digital_certificate>_DATA_</
            digital_certificate>
        </user_account_credentials>
    </user_accounts_details>
    <TS_request>
        <request_identifier>ID_request_1</request_identifier>
        <request_type>SIGN_TRANSACTION</request_type>
        <wallet_identifier>ID_Wallet1</wallet_identifier>
        <transaction_identifier>ID_transaction_1</
        transaction_identifier>
        <transaction_hash>256?bit hash value to be signed</
        transaction_hash>
        <keychain_path>m/0/0/1/0</keychain_path>
    </TS_request>
</auth_request>
```

The TSS server may send a TS request message 525 to a HSM 510 to request that the HSM sign the transaction. In one implementation, the TS request message may be sent via a HSM Access Provider and may include data such as a request identifier, a request type (e.g., sign message hash, get address hash), a wallet identifier, a transaction hash, a keychain path, and/or the like. For example, the TSS server may provide the following example TS request message, substantially in the form of a HTTP(S) POST message including XML-formatted data, as provided below:

```
POST /TS_request_message.php HTTP/1.1
Host: localhost
Content-Type: Application/XML
Content-Length: 667
<?XML version = "1.0" encoding = "UTF-8"?>
<TS_request_message>
    <request_identifier>ID_request_2</request_identifier>
    <request_type>SIGN_TRANSACTION</request_type>
    <wallet_identifier>ID_Wallet1</wallet_identifier>
    <transaction_hash>256-bit hash value to be signed</transaction_hash>
    <keychain_path>m/0/0/1/0</keychain_path>
</TS_request_message>
```

The HSM may make a SFTS API call 529 to a SFTS module 518 to request that the SFTS module sign the transaction. In one implementation, the SFTS API call may include data such as a request type (e.g., sign message hash, get address hash), a wallet identifier, a transaction hash, a keychain path, and/or the like.

Data provided in the SFTS API call may be used by a secure firmware transaction signing (SFTS) component 533 to sign the transaction (e.g., to generate an ECDSA signature in DER format). See FIG. 6 for additional details regarding the SFTS component.

In some embodiments, the SFTS module may send a master key request message 537 to a portable HSM 514 to request a master private key share (e.g., for a specified wallet) from the portable HSM. In one implementation, the master key request message may include data such as a request identifier, a calling HSM identifier, a wallet identifier, and/or the like. For example, the SFTS module may provide the following example master key request message, substantially in the form of a HTTP(S) POST message including XML-formatted data, as provided below:

```
POST /master_key_request_message.php HTTP/1.1
Host: localhost
Content-Type: Application/XML
Content-Length: 667
<?XML version = "1.0" encoding = "UTF-8"?>
<master_key_request_message>
    <request_identifier>ID_request_3</request_identifier>
    <calling_HSM_identifier>ID_HSM_1</calling_HSM_identifier>
    <wallet_identifier>ID_Wallet1</wallet_identifier>
</master_key_request_message>
```

The portable HSM may provide the encrypted master private key share to the SFTS module via a master key response message 541.

The SFTS module may send SFTS response data 545 to the HSM in response to the SFTS API call. In one implementation, the SFTS response data may include an ECDSA signature in DER format.

The HSM may send a TS response message 549 to the TSS server (e.g., via a HSM Access Provider). In one implementation, the TS response message may include data such as a response identifier, a transaction signature, and/or the like. For example, the HSM may provide the following example TS response message, substantially in the form of a HTTP(S) POST message including XML-formatted data, as provided below:

```
POST /TS_response_message.php HTTP/1.1
Host: www.server.com
Content-Type: Application/XML
Content-Length: 667
<?XML version = "1.0" encoding = "UTF-8"?>
<TS_response_message>
    <response_identifier>ID_response_2</response_identifier>
    <transaction_signature>ECDSA signature in DER format</
    transaction_signature>
</TS_response_message>
```

The TSS server may send a TS response 553 to the client. In one implementation, the TS response may include data such as a response identifier, a transaction identifier, a transaction signature, and/or the like.

```
POST /TS_response.php HTTP/1.1
Host: www.server.com
Content-Type: Application/XML
Content-Length: 667
```

```
<?XML version = "1.0" encoding = "UTF-8"?>
<TS_response>
    <response_identifier>ID_response_1</response_identifier>
    <transaction_identifier>ID_transaction_1</transaction_identifier>
    <transaction_signature>ECDSA signature in DER format</
    transaction_signature>
</TS_response>
```

Figure 6:
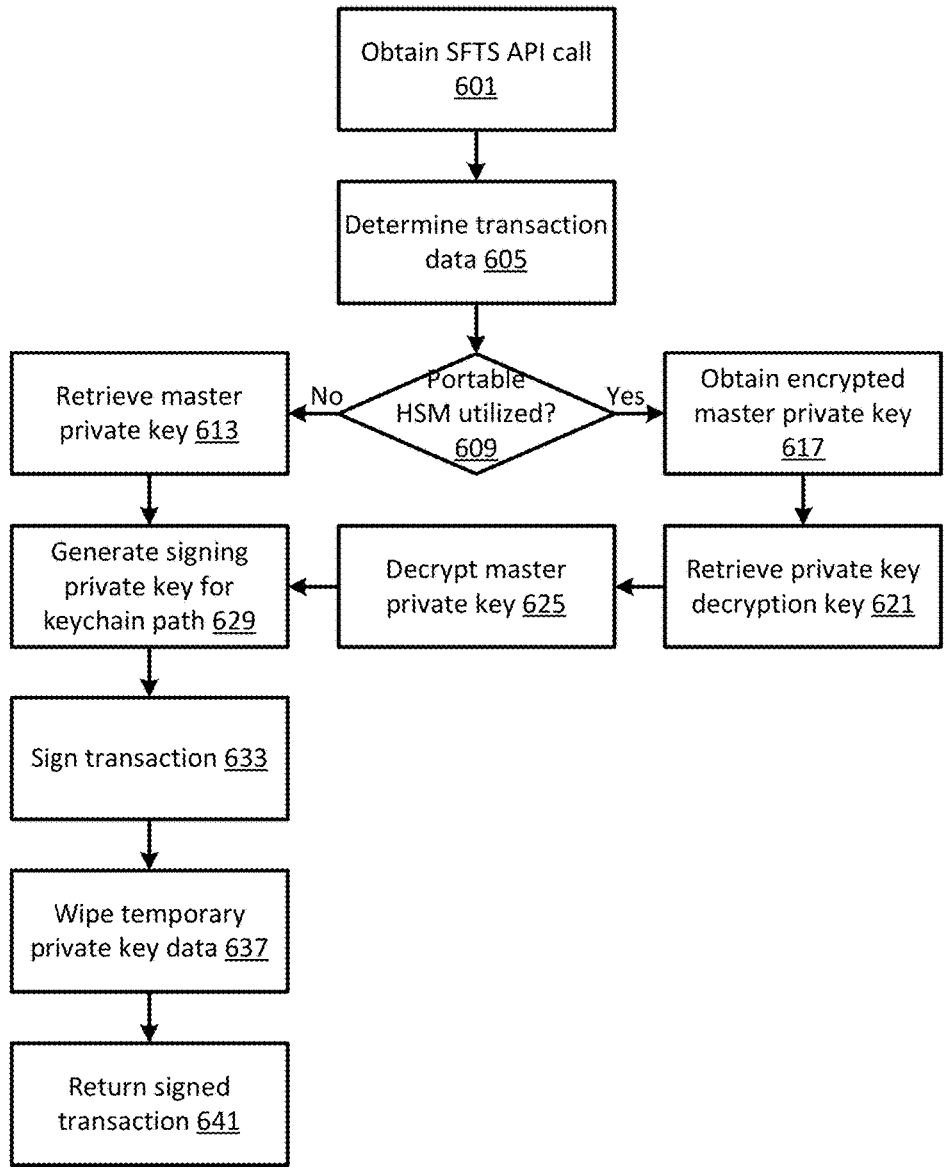
FIG. 6 shows a logic flow diagram illustrating embodiments of a secure firmware transaction signing (SFTS) component for the SFTSP.

FIG. 6 shows a logic flow diagram illustrating embodiments of a secure firmware transaction signing (SFTS) component for the SFTSP. In FIG. 6, a SFTS API call may be obtained at 601. For example, the SFTS API call may be obtained as a result of a call from a HSM associated with the SFTS component. It is to be understood that although the SFTS component is described with regard to an API method to sign a transaction (e.g., signMessageHash), in some embodiment, a variety of API methods may be available. In one embodiment, the following API methods may be available to the HSM and/or to a TSS:

```
signMessageHash - this method receives a message hash and a keychain
path and returns an ECDSA signature value. Key derivation steps are
implemented by the SFTS component. Temporary keys generated for
signing are wiped out of the device once the signing process is complete.
    Input:
        256-bit hash value to be signed
        keychain path to be used for Bip32 key derivation
    Output:
        ECDSA signature in DER format
getAddressHash - this method returns a public Pay-to-Script-Hash (P2SH)
address generated for a given keychain path. SFTS component code uses
N extended master public keys stored inside the HSM, generates N public
keys corresponding to the provided keychain path, and generates a Bitcoin
address that can be used for receiving funds.
    Input:
        keychain path to be used for Bip32 key derivation
    Output:
        P2SH hash value that can be converted by the requesting
application (e.g., client application) into a Bitcoin address in the
appropriate format (e.g., main Bitcoin network, Testnet, etc.)
```

Transaction data may be determined at 605. In one implementation, the transaction data may be provided in the SFTS API call and may include a wallet identifier, a transaction hash, a keychain path, and/or the like.

A determination may be made whether a portable HSM is being utilized to sign the transaction. For example, a portable HSM may not be utilized for a hot wallet transaction. In another example, a portable HSM may be utilized for a cold wallet transaction. In one implementation, this determination may be made by checking a setting associated with the HSM.

If a portable HSM is not being utilized, a master private key may be retrieved at 613. In one implementation, the master private key may be determined using a PKCS#11 function (e.g., C_FindObjectsInit( . . . )). In another implementation, the master private key may be determined via an internal call on a HSM environment setting configured externally at HSM deployment time.

If a portable HSM is being utilized, an encrypted master private key may be obtained at 617. In one implementation, the portable HSM may be queried to obtain the encrypted private master key share. For example, the private master key share may be encrypted using a public key encryption key (e.g., associated with the HSM) stored by the portable HSM. A private key decryption key for the HSM may be retrieved at 621. In one implementation, the private key decryption key may be determined using a PKCS#11 function (e.g., C_FindObjectsInit( . . . )). In another implementation, the private key decryption key may be determined via an internal call on a HSM environment setting configured externally at HSM deployment time.

Although one may choose to use the above to determine the master private key and/or the private key decryption key, in an alternative embodiment, the master private key and/or the private key decryption key may be determined via a MySQL database command (e.g., retrieved from a MySQL database in tamper-proof storage).

The encrypted master private key share may be decrypted at 625 using the retrieved private key decryption key.

A signing private key for the specified keychain path may be generated at 629. In one implementation, the signing private key may be generated in accordance with a deterministic key derivation procedure as described in Bip32. The transaction may be signed at 633. In one implementation, the generated signing private key may be used to sign the transaction hash in accordance with the hashing algorithm utilized by the Bitcoin protocol (e.g., RIPE160(SHA256(SHA256(message)))).

Temporary private key data may be wiped from memory at 637. In one implementation, the master private key obtained from the portable HSM and/or the generated signing private key may be wiped from memory of the HSM associated with the SFTS component. The signed transaction may be returned at 641. In one implementation, the Elliptic Curve Digital Signature Algorithm (ECDSA) signature in DER format may be returned.

Figure 7:
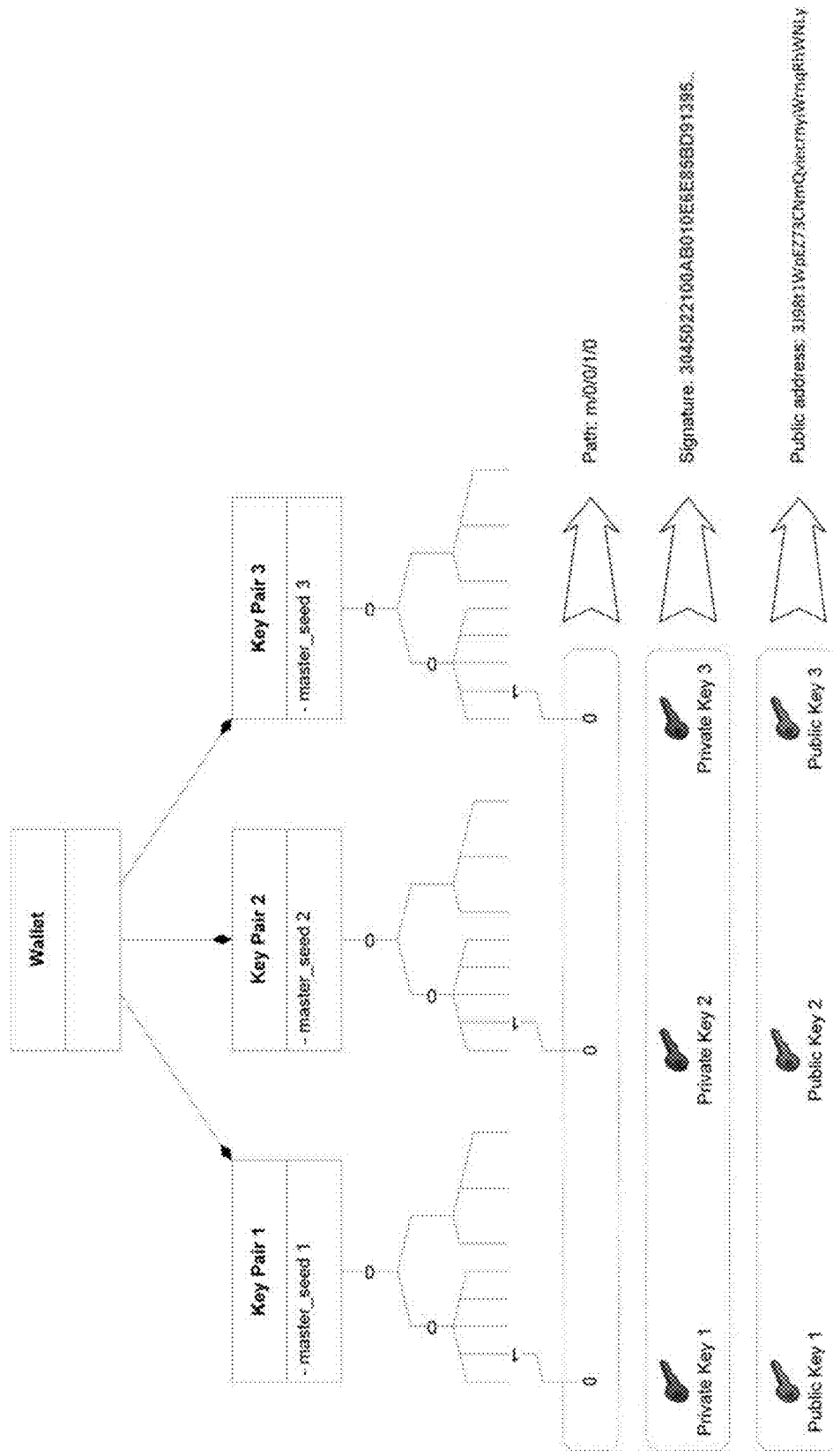
FIG. 7 shows an exemplary data model for the SFTSP.

FIG. 7 shows an exemplary data model for the SFTSP. In one embodiment, the data model may be a Bip32 data model. In FIG. 7, a wallet composed of N (e.g., 3) master keys (or seeds) is shown. For each path, a pair of private and public keys may be derived. A private key may be used for generating a signature; a public key may be used for a public address for receiving funds.

Figure 8:
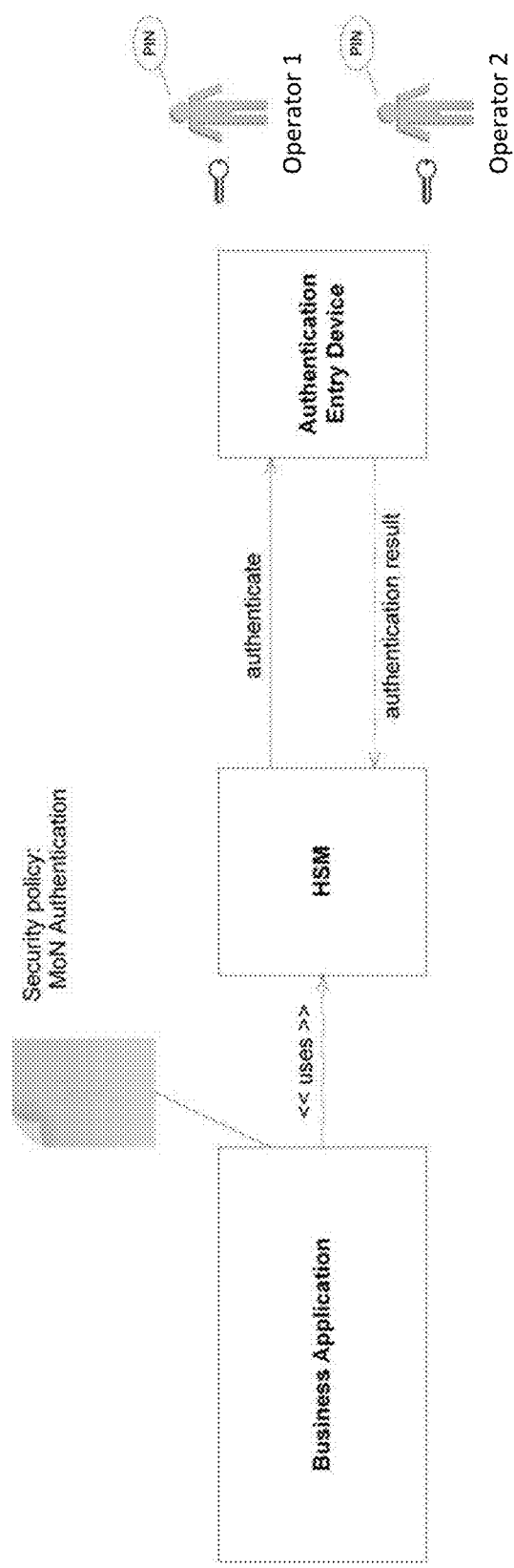
FIG. 8 shows an exemplary authentication model for the SFTSP.

FIG. 8 shows an exemplary authentication model for the SFTSP. In FIG. 8, M-of-N authentication utilizing an HSM is illustrated. For example, in order to start a highly sensitive business application operation (e.g., transaction signing for a transfer of large funds between accounts, key backup, key recovery), several physically present persons may have to authenticate to the HSM. Physical presence is ensured by presenting a physical authentication device, such as a smart card, token or encrypted key on a USB device. In addition to the physical device, each person also may have to authenticate using a password or PIN, which makes it a multi-factor authentication (MFA) process with the first factor being a key (something to have) and the second factor a PIN (something to know). This is schematically shown in FIG. 8 where two operators, each holding an encrypted key on a USB memory stick, one after another insert their USB key into an authentication entry device attached to a HSM and confirm their ownership of the key by entering a PIN associated with the key in order to start a business application operation. Authentication to the HSM may be tightly integrated in HSM firmware for access control and protection of key objects stored on the HSM through a key hierarchy of user keys on the USB token and master encryption keys on the HSM.

Security policy, defined for a business application and enforced on the HSM, contains a minimum number of persons that should successfully authenticate to the system out of a larger number of people that hold authentication keys and PINs. If we have N operators with separate USB keys and PINs but any M of them can authenticate to the system, this so called M-of-N (or MoN) authentication policy covers such real life situations as two-person access control, work force rotation, leaves of absence, sickness, etc. See FIG. 9 for an example of valid authentication combinations for N=3 and M=2.

Figure 9:
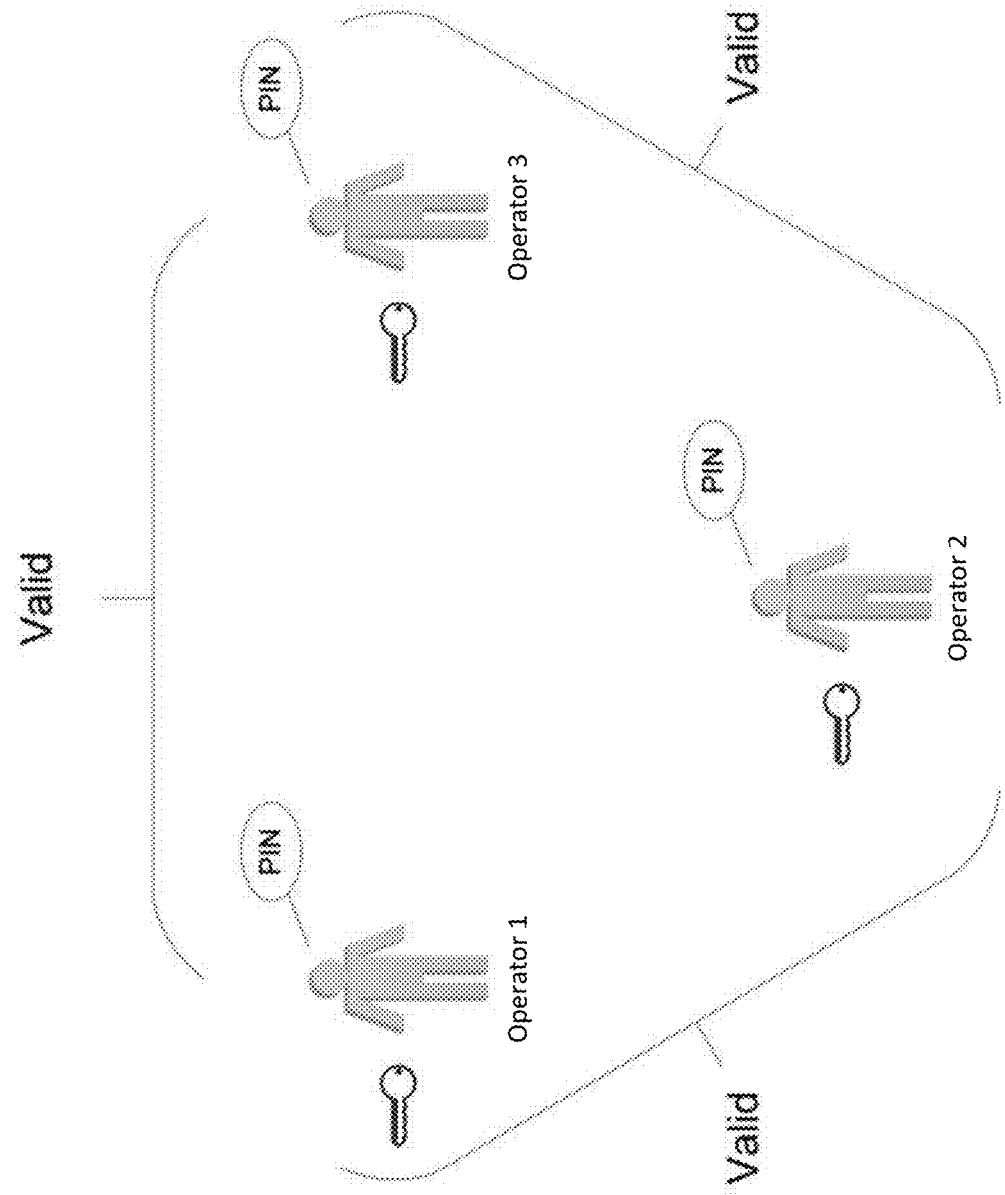
FIG. 9 shows an exemplary authentication use case for the SFTSP.

FIG. 9 shows an exemplary authentication use case for the SFTSP. In FIG. 9, valid authentication combinations for N=3 and M=2 are illustrated. As shown in FIG. 9, valid authentication combinations include: operator 1 and operator 2, operator 2 and operator 3, and operator 1 and operator 3.

Figure 10:
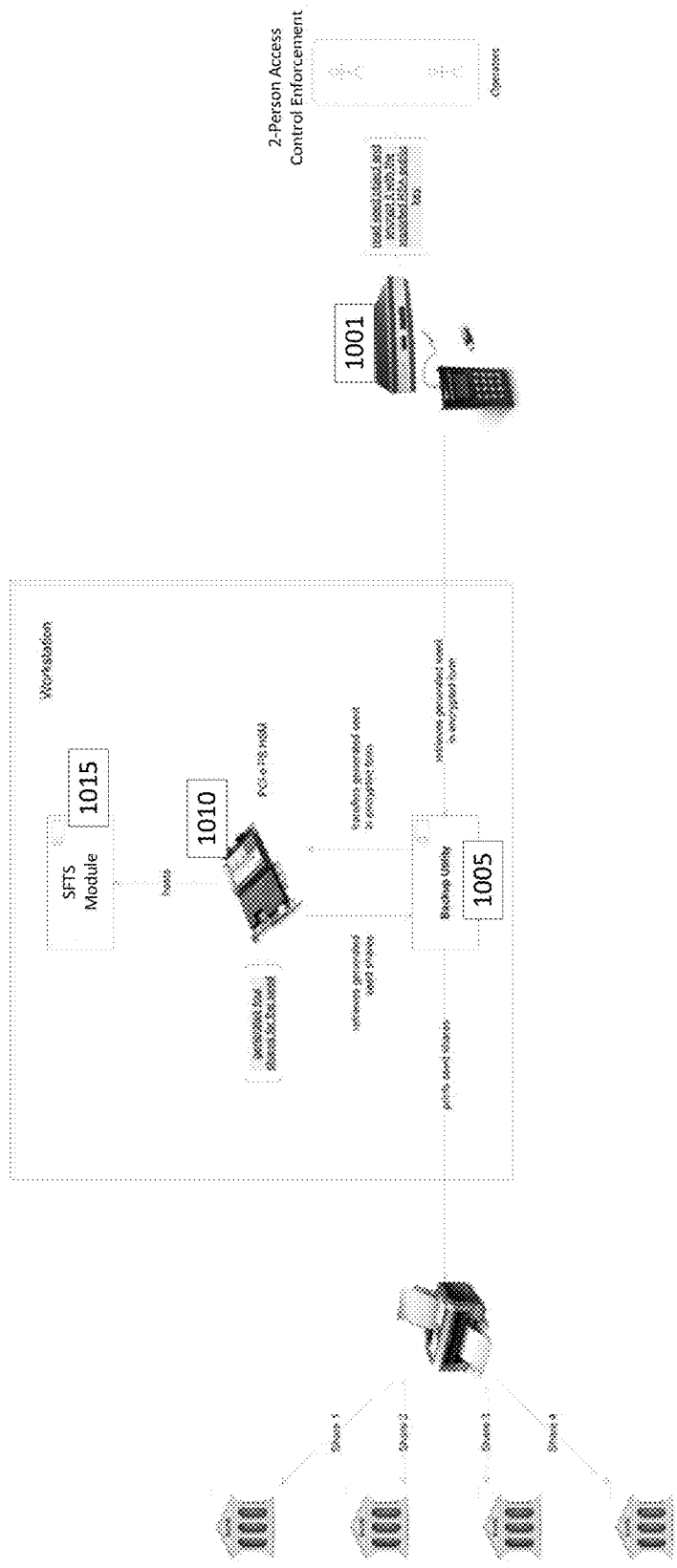
FIG. 10 shows an exemplary key backup model for the SFTSP.

FIG. 10 shows an exemplary key backup model for the SFTSP. In FIG. 10, a seed (e.g., master key) may be backed up using seed shares. The seed may be generated and may be stored on a seed hosting HSM 1001 (e.g., Gemalto's G5 HSM), which supports M-of-N authentication. For example, this may be done as part of a master key generation operation. A backup utility 1005 may request that a backup HSM 1010 (e.g., Gemalto's ProtectServer PCI-e HSM), which supports firmware module extensions and hosts SFTS module 1015, generate a RSA key pair and provide the generated public key. The backup utility may export the generated RSA public key from the backup HSM and import it into the hosting HSM. The backup utility may request an export of the seed from the hosting HSM encrypted with the imported RSA public key. Operators may approve the seed export request by authenticating to an authentication entry device associated with the hosting HSM (e.g., using 2-of-3 access control enforcement). The backup utility may transfer the encrypted seed to the backup HSM. The backup HSM may decrypt the seed using the previously generated RSA private key and may create a local copy of the seed in memory protected from external intrusion. The backup utility may utilize an API call to request seed shares, generated using an implemented secret sharing method, from the backup HSM. See FIG. 14 for an example of a secret sharing method. The backup utility may print the provided seed shares (e.g., one at a time on a separate sealed tamper-protected form), and the printed seed shares may be distributed for storage in geographically distributed locations in order to avoid the recovery of a complete seed from shares available at any single location. Thus, the full seed is not exposed in decrypted form outside of an HSM device (e.g., in RAM of the host workstation) during the key backup process, which eliminates the risk of memory-attack theft. As seed shares may be backed up separately (e.g., on paper in bank safety boxes), multi-person access control and segmentation is further enforced.

Figure 11B:
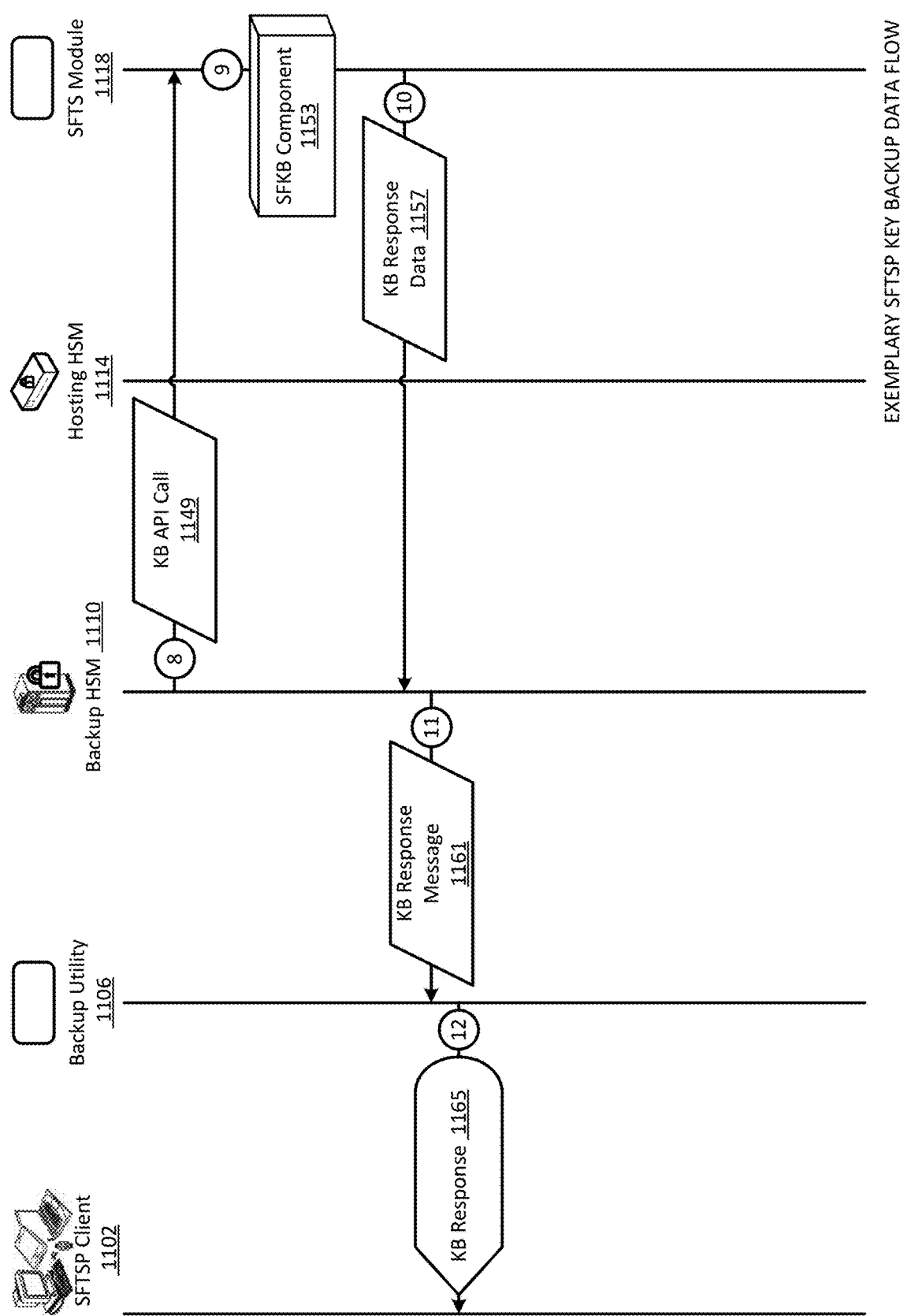

FIGS. 11A-B show a datagraph diagram illustrating embodiments of a data flow for the SFTSP. In FIGS. 11A-B, a user of a SFTSP client 1102 may send a key backup request 1121 to a backup utility 1106 to facilitate key backup (e.g., of a master key associated with a hierarchical deterministic wallet). For example, the SFTSP client may be a desktop, a laptop, a tablet, a smartphone, and/or the like that is executing the backup utility. In one implementation, the key backup request may include parameters specified by the user (e.g., via a user interface (UI) of the backup utility) such as a request type (e.g., backup master key, recover master key), a wallet identifier (e.g., of the wallet whose master key should be backed up), the number of master key shares to generate, the number of master key shares sufficient to recover the master key, and/or the like.

A backup utility key backup (BUKB) component 1125 may utilize parameters provided in the key backup request to facilitate generation of backup materials for the relevant master key (e.g., for the specified wallet). See FIG. 12 for additional details regarding the BUKB component.

The backup utility may send a public key request message 1129 to a backup HSM 1110 to request a RSA public key from the backup HSM. In one implementation, the public key request message may include data such as a request identifier, a backup request identifier, and/or the like. In one embodiment, the backup utility may provide the following example public key request message, substantially in the form of a HTTP(S) POST message including XML-formatted data, as provided below:

```
POST /public_key_request_message.php HTTP/1.1
Host: www.server.com
Content-Type: Application/XML
Content-Length: 667
<?XML version = "1.0" encoding = "UTF-8"?>
<public_key_request_message>
    <request_identifier>ID_request_11</request_identifier>
    <backup_request_identifier>ID_backup_request_1</backup_request_identifier>
</public_key_request_message>
```

The backup HSM may provide a RSA public key to the backup utility via a public key response message 1133. In one implementation, the public key response message may include data such as a request identifier, a backup request identifier, a RSA public key, and/or the like. In one embodiment, the backup HSM may provide the following example public key response message, substantially in the form of a HTTP(S) POST message including XML-formatted data, as provided below:

```
POST /public_key_response_message.php HTTP/1.1
Host: www.server.com
Content-Type: Application/XML
Content-Length: 667
<?XML version = "1.0" encoding = "UTF-8"?>
<public_key_response_message>
    <response_identifier>ID_response_11</response_identifier>
    <backup_request_identifier>ID_backup_request_1</backup_request_identifier>
    <RSA_public_key>RSA public key provided by the backup HSM</RSA_public_key>
</public_key_response_message>
```

The backup utility may send a master key request message 1137 to a hosting HSM 1114 to request an encrypted master key (e.g., for the specified wallet) from the hosting HSM. In one implementation, the master key request message may include data such as a request identifier, a backup request identifier, a wallet identifier, a RSA public key, and/or the like. In one embodiment, the backup utility may provide the following example master key request message, substantially in the form of a HTTP(S) POST message including XML-formatted data, as provided below:

```
POST /master_key_request_message.php HTTP/1.1
Host: localhost
Content-Type: Application/XML
Content-Length: 667
<?XML version = "1.0" encoding = "UTF-8"?>
<master_key_request_message>
    <request_identifier>ID_request_12</request_identifier>
    <backup_request_identifier>ID_backup_request_1</backup_request_identifier>
    <wallet_identifier>ID_Wallet1</wallet_identifier>
    <RSA_public_key>RSA public key provided by the backup HSM</RSA_public_key>
</master_key_request_message>
```

The hosting HSM may provide the encrypted master key to the backup utility via a master key response message 1141. In one implementation, the master key response message may include data such as a response identifier, a backup request identifier, a wallet identifier, an encrypted master key, and/or the like. In one embodiment, the hosting HSM may provide the following example master key response message, substantially in the form of a HTTP(S) POST message including XML-formatted data, as provided below:

```
POST /master_key_response_message.php HTTP/1.1
Host: localhost
Content-Type: Application/XML
Content-Length: 667
<?XML version = "1.0" encoding = "UTF-8"?>
<master_key_response_message>
    <response_identifier>ID_response_12</response_identifier>
    <backup_request_identifier>ID_backup_request_1</backup_request_identifier>
    <wallet_identifier>ID_Wallet1</wallet_identifier>
    <master_key>encrypted master key provided by the hosting HSM</master_key>
</master_key_response_message>
```

The backup utility may send a key backup request message 1145 to the backup HSM to request master key shares for the encrypted master key from the backup HSM. In one implementation, the key backup request message may include data such as a request identifier, a request type, a backup request identifier, an encrypted master key, the number of master key shares to generate, the number of master key shares sufficient to recover the master key, and/or the like. In one embodiment, the backup utility may provide the following example key backup request message, substantially in the form of a HTTP(S) POST message including XML-formatted data, as provided below:

```
POST /key_backup_request_message.php HTTP/1.1
Host: localhost
Content-Type: Application/XML
Content-Length: 667
<?XML version = "1.0" encoding = "UTF-8"?>
<key_backup_request_message>
    <request_identifier>ID_request_13</request_identifier>
    <request_type>BACKUP_MASTER_KEY</request_type>
    <backup_request_identifier>ID_backup_request_1</backup_request_identifier>
    <master_key>encrypted master key provided by the hosting HSM</master_key>
```
```
    <number_of_shares_to_generate>4</number_of_shares_to_generate>
    <number_of_shares_sufficient_to_recover>2</number_of_shares_sufficient_to_recover>
</key_backup_request_message>
```

The backup HSM may make a key backup API call 1149 to a SFTS module 1118 to request that the SFTS module generate master key shares. In one implementation, the key backup API call may include data such as a request type (e.g., backup master key, recover master key), an encrypted master key, the number of master key shares to generate, the number of master key shares sufficient to recover the master key, and/or the like.

Data provided in the key backup API call may be used by a secure firmware key backup (SFKB) component 1153 to generate master key shares. See FIG. 13 for additional details regarding the SFKB component.

The SFTS module may send key backup response data 1157 to the backup HSM in response to the key backup API call. In one implementation, the key backup response data may include the generated master key shares.

The backup HSM may send a key backup response message 1161 to the backup utility. In one implementation, the key backup response message may include data such as a response identifier, a backup request identifier, generated master key shares, and/or the like. For example, data provided in the key backup response message may be utilized by the backup utility to facilitate printing and/or distributing the generated master key shares. In one embodiment, the backup HSM may provide the following example key backup response message, substantially in the form of a HTTP(S) POST message including XML-formatted data, as provided below:

```
POST /key_backup_response_message.php HTTP/1.1
Host: localhost
Content-Type: Application/XML
Content-Length: 667
<?XML version = "1.0" encoding = "UTF-8"?>
<key_backup_response_message>
    <response_identifier>ID_response_13</response_identifier>
    <backup_request_identifier>ID_backup_request_1</backup_request_identifier>
    <master_key_shares>
        <share>0_1D7927D78EAD692BB1694497180C66B3E88676F22B920625EDECAA1728F2921E5E309297B76FE658B61DF9D501B49F8553255DFDC8FE966F2950DDD0078C809B02</share>
        <share>1_01658051EB654BBD692013E6E5FB6BA2D9C36980AE0D592D4D07516910646EE05B223C3C13C1DF6736232724DF32644791E4A1217DD642C8A7C0A240311DBD1172FE</share>
        <share>2_0191E6488B7976C0C147B244239459E2FF3DA2C64B554B9F215D1D6E8261B9F8D9A1E78AC218260A8EEFCBD56A1BAE4E68A7F53DB2103AA70FBC070E8B0BFF414147</share>
        <share>3_01B2D2F13EBB73D1B486D84BA81B173D99AB2F56322452CDF97459965513F74F5F7DD92EE1084F8847CBDA9FE118A133FEC788513A70C8B1343502C3C309052568E5</share>
    </master_key_shares>
</key_backup_response_message>
```

The backup utility may send a key backup response 1165 to the user. For example, the key backup response may be used to inform the user whether the key backup was completed successfully (e.g., via a UI of the backup utility).

Figure 12:
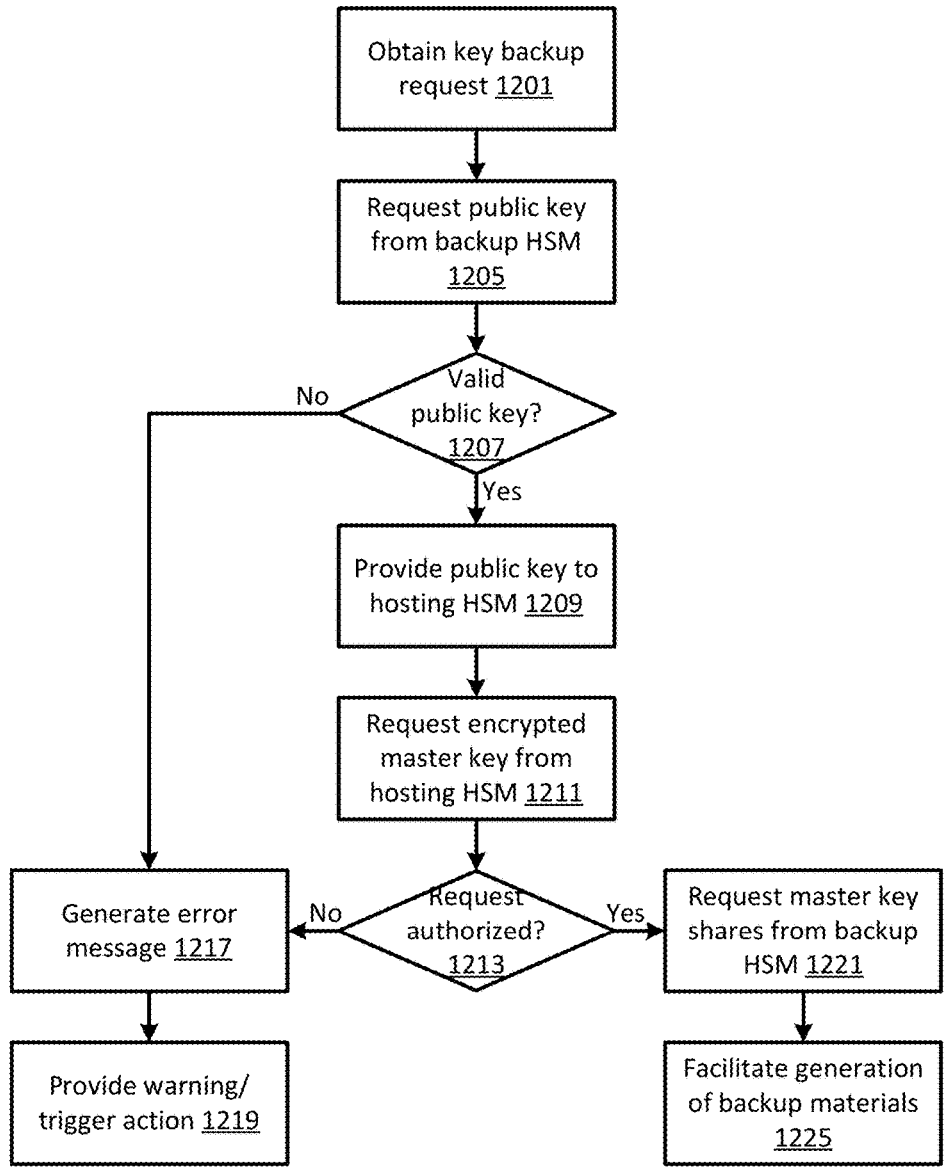
FIG. 12 shows a logic flow diagram illustrating embodiments of a backup utility key backup (BUKB) component for the SFTSP.

FIG. 12 shows a logic flow diagram illustrating embodiments of a backup utility key backup (BUKB) component for the SFTSP. In FIG. 12, a key backup request may be obtained at 1201. For example, the key backup request may be obtained as a result of a user utilizing a UI of a backup utility to initiate key backup of a master key associated with a hierarchical deterministic wallet. See FIG. 17 for an example of a UI that may be utilized by the user.

A RSA public key may be requested from a backup HSM at 1205. In one implementation, a public key request message may be sent to the backup HSM to request the RSA public key.

A determination may be made at 1207 whether the obtained RSA public key is valid. For example, the backup utility may be configured to work with a specified set of backup HSMs, and the obtained RSA public key may have to be associated with one of the specified backup HSMs to be valid.

If the obtained RSA public key is not valid, an error message may be generated at 1217. For example, the error message may specify the error that occurred (e.g., RSA public key is not valid). A warning message may be provided to the user and/or an action may be triggered at 1219. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, the RSA public key may be provided to a hosting HSM at 1209. For example, the RSA public key may be utilized by the hosting HSM to encrypt the master key hosted by the hosting HSM such that the corresponding RSA private key, available to the backup HSM, may be used to decrypt the master key. In one implementation, the RSA public key may be forwarded to the hosting HSM via a master key request message.

An encrypted master key (e.g., for the specified wallet) may be requested from the hosting HSM at 1211. In one implementation, a master key request message may be sent to the hosting HSM to request the master key encrypted with the RSA public key.

A determination may be made at 1213 whether the request for the encrypted master key is authorized. In one implementation, one or more operators (e.g., based on M-of-N authentication) may have to approve (e.g., via an authentication entry device associated with the hosting HSM) the request to export the encrypted master key from the hosting HSM for the request to be authorized.

If the request for the encrypted master key is not authorized, an error message may be generated at 1217. For example, the error message may specify the error that occurred (e.g., request to export the encrypted master key from the hosting HSM is not authorized). A warning message may be provided to the user and/or an action may be triggered at 1219. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the request for the encrypted master key is authorized, master key shares for the master key may be requested from the backup HSM at 1221. In one implementation, a key backup request message may be sent to the backup HSM to request generation of master key shares. For example, the key backup request message may specify how many master key shares to generate and/or how many master key shares should be sufficient to recover the master key.

Generation of backup materials may be facilitated at 1225. In various implementations, the provided master key shares may be backed up using backup materials such as paper printouts, metal or plastic plates (e.g., Cryptosteel), USB keys, hard drives, solid state drives, portable HSMs, and/or the like. For example, the provided master key shares may be printed out (e.g., one at a time on a separate sealed tamper-evident form). See FIG. 15 for an example of a tamper-evident paper form. The backup materials may be distributed for storage in geographically distributed locations. In some implementations, a hybrid combination of several backup materials may be used (e.g., 4 paper copies, 4 USB keys and 4 portable HSM devices). For example, each geographic backup location may store a mixture of different types of backup materials or materials of just one type. See FIG. 16 for an example of how the provided master key shares may be distributed and stored geographically.

Figure 13:
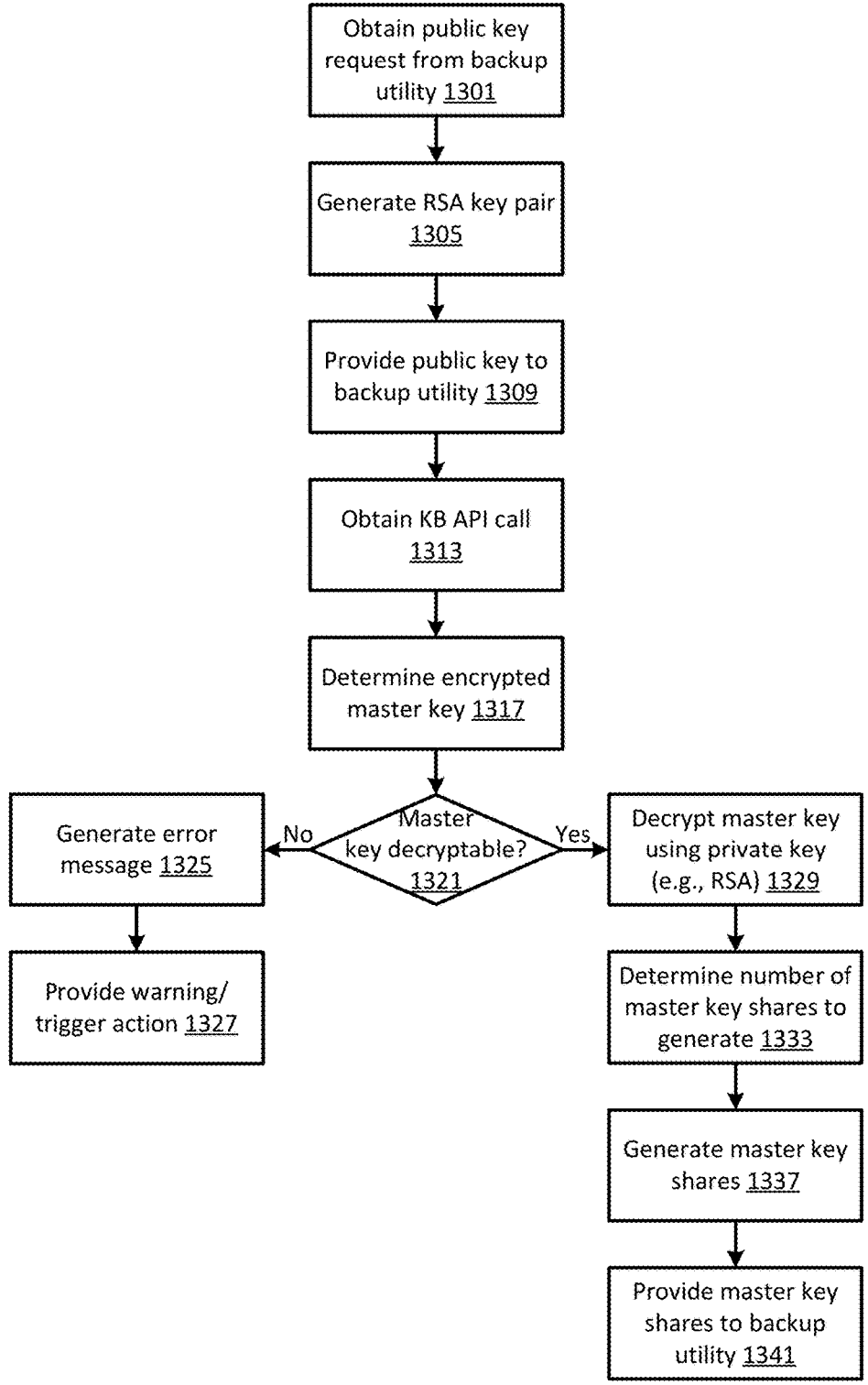
FIG. 13 shows a logic flow diagram illustrating embodiments of a secure firmware key backup (SFKB) component for the SFTSP.

FIG. 13 shows a logic flow diagram illustrating embodiments of a secure firmware key backup (SFKB) component for the SFTSP. In FIG. 13, a public key request from a backup utility may be obtained at 1301. For example, the public key request may be obtained as a result of the backup utility executing a key backup.

A RSA key pair may be generated at 1305. In one embodiment, a RSA key pair (e.g., a RSA public key and a corresponding RSA private key) may be predefined (e.g., for a backup HSM). In one implementation, the RSA public key may be determined using a PKCS#11 function (e.g., C_FindObjectsInit( . . . )). In another implementation, the RSA public key may be determined via an internal call on a backup HSM environment setting configured externally at HSM deployment time. In an alternative implementation, the RSA public key may be determined via a MySQL database command (e.g., retrieved from a MySQL database in tamper-proof storage). In another embodiment, a RSA key pair may be generated dynamically (e.g., each time a key backup is executed). In one implementation, a RSA public key may be generated using a PKCS#11 function (e.g., C_CreateObject( . . . )).

The RSA public key may be provided to the backup utility at 1309. In one implementation, the RSA public key may be provided to the backup utility via a public key response message.

A key backup API call may be obtained at 1313. For example, the key backup API call may be obtained as a result of a call from the backup HSM (e.g., based on receiving a key backup request message from the backup utility) associated with the SFKB component. In one embodiment, the following API method may be available to the backup HSM and/or to the backup utility:

SplitSeed—this method receives a master key value, 512-bit number, and returns an array of master key secret shares. Generation of master key shares is implemented by the SFKB component. Temporary materials, including the decrypted master key value, are wiped out of the device once the master key shares generation process is complete.

Input:
  512-bit master key value encrypted with an RSA public key generated by the backup HSM Output:
  full array of 256-bit master key shares (N master key shares)

In one implementation, a C implementation of this method for M-of-N key split may have the following interface:

```
SplitSeed(CK_ULONG slot_id,
    const char *pin,
    CK_OBJECT_HANDLE hSeed,
    CK_ULONG rec_shares_num,
    CK_ULONG backup_shares_num,
    CK_BYTE_PTR pRng_seed,
    CK_ULONG rng_seed_len,
    CK_BYTE_PTR *ppShares,
    CK_ULONG_PTR pShares_len);
```

The following table describes input and output parameters:

| Name | Input/Output | Type | Description | Sample Values |
| --- | --- | --- | --- | --- |
| slot_id | In | CK_ULONG | Identifier of the target slot inside HSM | 0 |
| pin | In | const char * | User token PIN for HSM | 0123 |
| hSeed | In | CK_OBJECT_HANDLE | Handle value of the master key | 1000 |
| rec_shares_num | In | CK_ULONG | Number of recovery shares (M) sufficient to recover the original seed. | 4 |
| backup_shares_num | In | CK_ULONG | Number of backup shares (N) to be generated. | 12 |
| pRng_seed | In | CK_BYTE_PTR | Pointer to a byte array containing an initialization seed for the random number generator | |
| rng_seed_len | In | CK_ULONG | Length of the array containing an initialization seed for the random number generator | 64 |
| ppShares | Out | CK_BYTE_PTR * | Pointer to the pointer to a byte array containing the generated secret shares | |
| pShares_len | Out | CK_ULONG_PTR | Pointer to a long number containing the length of the byte array containing the generated secret shares | 64 |

An encrypted master key for which master key shares should be generated may be determined at 1317. In one implementation, the encrypted master key may be provided as an input parameter in the key backup API call.

A determination may be made at 1321 whether the encrypted master key is decryptable. In one implementation, this determination may be made by checking whether decrypting the encrypted master key using the RSA private key results in a valid object.

If the encrypted master key is not decryptable, an error message may be generated at 1325. For example, the error message may specify the error that occurred (e.g., master key is not decryptable). A warning message may be provided to a user and/or an action may be triggered at 1327. In one implementation, a warning message based on the generated error message may be provided to the user (e.g., via the backup utility) to inform the user regarding the error. In another implementation, an action may be triggered based on a specified condition (e.g., non-decryptable master key obtained three times). For example, the triggered action may be to erase data associated with a wallet. In another example, the triggered action may be to invalidate the master key and to generate a new master key.

If the encrypted master key is decryptable, the encrypted master key may be decrypted using the RSA private key at 1329. In one implementation, the encrypted master key may be decrypted using a PKCS#11 function (e.g., C_Decrypt( . . . )).

The number of master key shares to generate and/or the number of master key shares that should be sufficient to recover the master key may be determined at 1333. In one implementation, this data may be provided as input parameters in the key backup API call.

Master key shares for the master key may be generated at 1337. In one embodiment, a method such as Shamir's Secret Sharing may be utilized to generate master key shares based on the specified number of master key shares to generate and/or the specified number of master key shares that should be sufficient to recover the master key. See FIG. 14 for additional details regarding utilizing Shamir's Secret Sharing. In one implementation, the generated master key shares may take on the following form (e.g., in hexadecimal format):

0_1D7927D78EAD692BB1694497180C66B3E88676F2
2B920625EDECAA1728F2921E5E309297B76FE
658B61DF9D501B49FB553255DFDC8FE966F2950
DDD0078C809B02
1_01658051EB654BBD692013E6E5FB6BA2D9C3698
0AE0D592D4D07516910646EE05B223C3C13C1D
F6736232724DF32644791E4A1217DD642C8A7C0A
240311DBD1172FE
2_0191E6488B7976C0C147B244239459E2FF3DA2C6
4B554B9F215D1D6E8261B9F8D9A1E78AC2182
60A8EEFCBD56A1BAE4E68A7F53DB2103AA70F
BC070E8B0BFF414147
3_01B2D2F13EBB73D1B486D84BA81B173D99AB2F
56322452CDF97459965513F74F5F7DD92EE1084
F8847CBDA9FE118A133FEC788513A70C8B13435
02C3C309052568E5

Where 0_, . . . , 3_designate a master key share's index and the rest is its value.

The generated master key shares may be provided to the backup utility at 1341. In one implementation, the master key shares may be returned to the backup HSM as the output of the key backup API call, and/or the backup HSM may provide the master key shares to the backup utility via a key backup response message.

Figure 14:
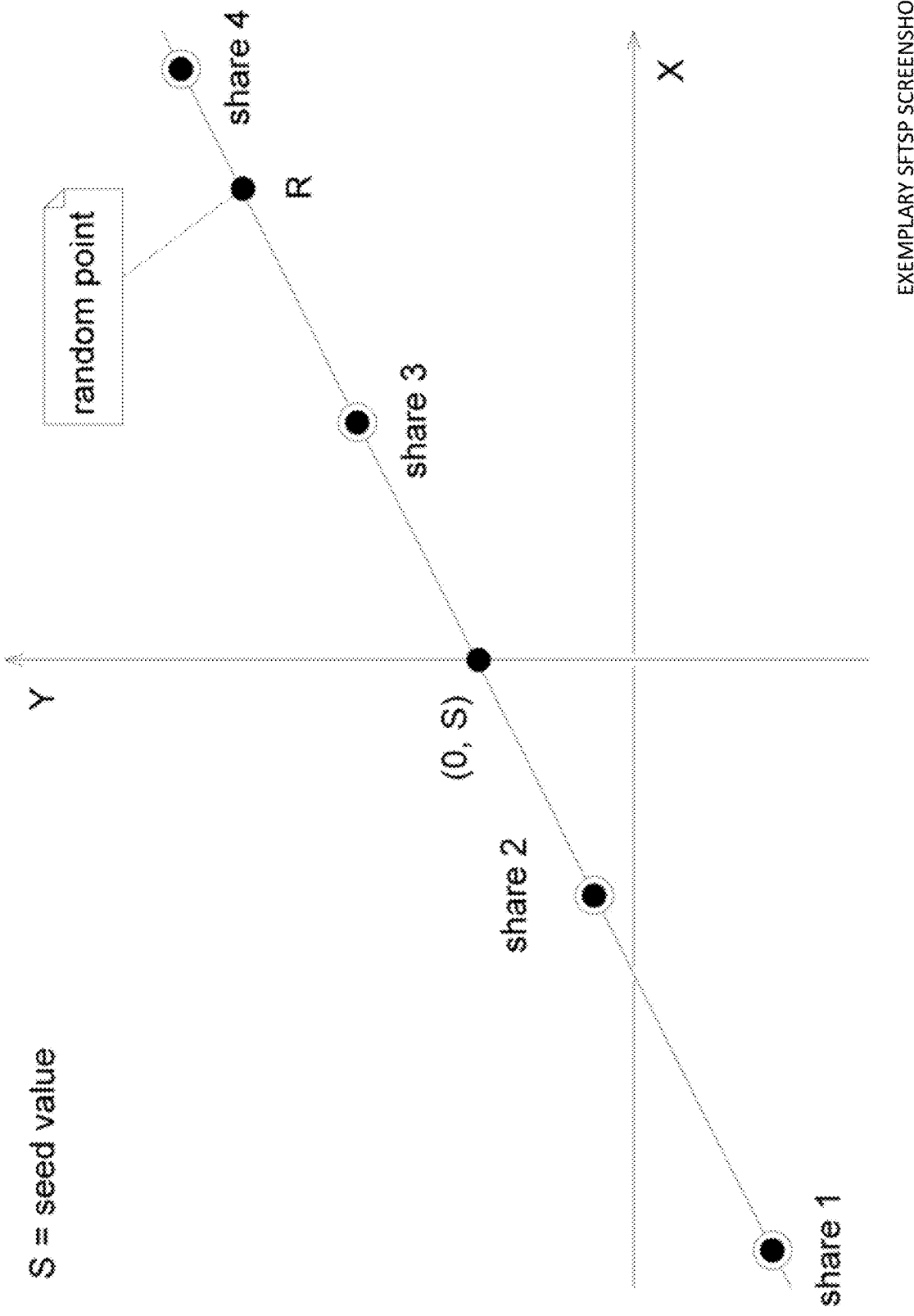
FIG. 14 shows a screenshot diagram illustrating embodiments of the SFTSP.

FIG. 14 shows a screenshot diagram illustrating embodiments of the SFTSP. In FIG. 14, Shamir's Secret Sharing method that may be utilized for secret sharing and/or secret recovery is illustrated. Shamir's Secret Sharing is based on the generic algebraic fact that knowing N different points is sufficient to recover a polynomial of the order of N−1. For example, two points on a coordinate plane define a line on that plane. As shown in FIG. 14, this may be used to generate several secret shares any pair of which can be used to restore the original secret.

For a seed value S, a point with coordinates (0, S) may be chosen (i.e., a point on the Y axis). A second point R with coordinates (X, Y) may be randomly generated (e.g., using two random numbers X and Y). Together this random point (X, Y) and point (0, S) define a line on the coordinate plane. Any number (e.g., the specified number of master key shares to generate) of points (e.g., any four points) on this line may be selected to become the secret shares—each point by itself does not reveal any information about the original number S. However, any pair of such points fully recovers the original line whose Y-intercept gives the seed value S.

In one implementation, in order to reduce the size of the backup key materials used in calculations, a pre-determined set of X-coordinate values (e.g., $10^2$, $10^4$, $10^6$, $10^8$) may be used for the shares and the Y-coordinates may be referred to by their indices in the range (e.g., [0 . . . 3]).

In implementations where more than two points (e.g., three points) are specified as being sufficient to recover the seed value S, Lagrange interpolation of polynomials may be utilized to generate secret shares and/or to recover the seed value.

Figure 15:
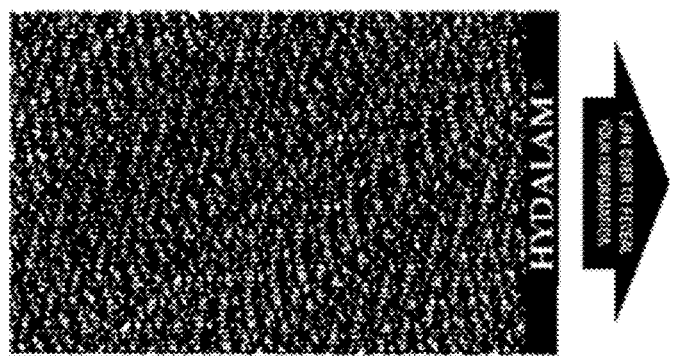
FIG. 15 shows a screenshot diagram illustrating embodiments of the SFTSP.

FIG. 15 shows a screenshot diagram illustrating embodiments of the SFTSP. In FIG. 15, a sample printed copy of concealed secret share's data on a tamper-evident paper form is illustrated.

Figure 16:
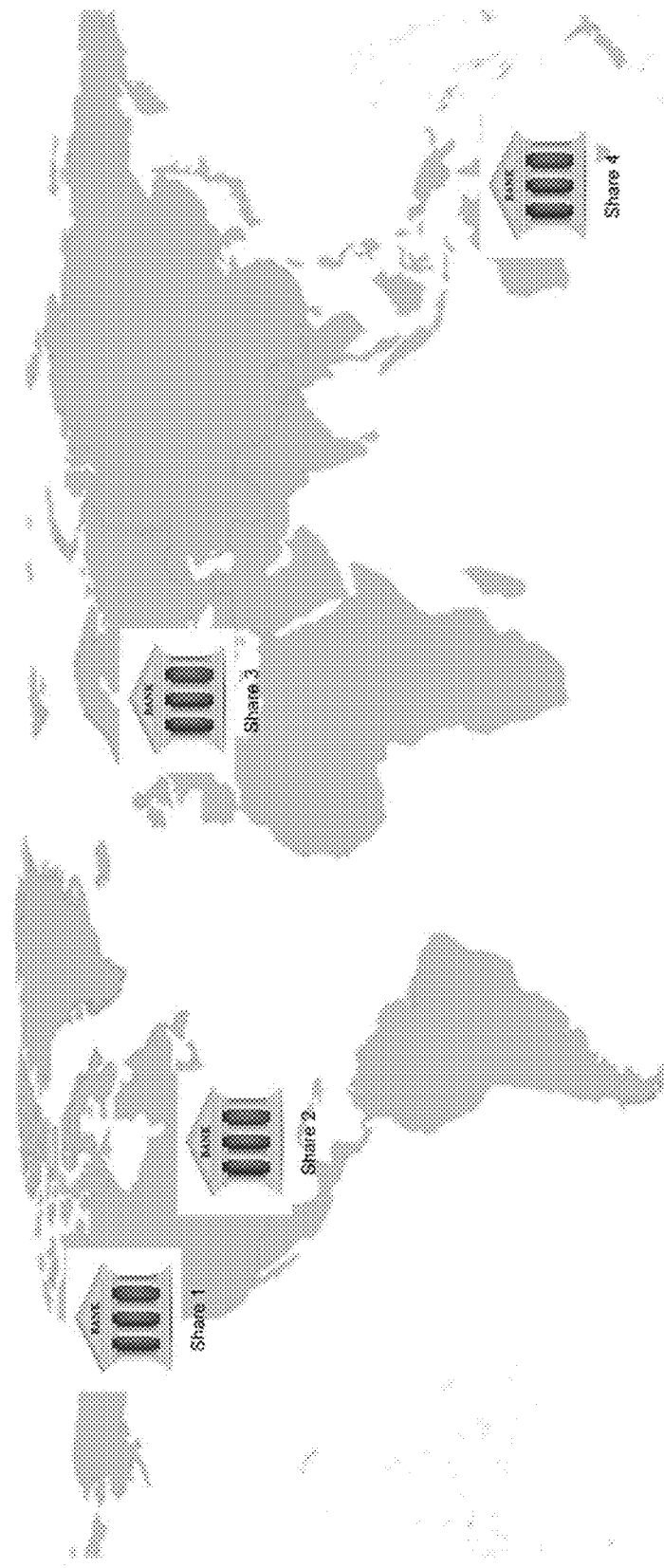
FIG. 16 shows an exemplary seed shares geographic distribution model for the SFTSP.

FIG. 16 shows an exemplary seed shares geographic distribution model for the SFTSP. In FIG. 16, a schematic diagram of how generated seed shares may be distributed and stored geographically is shown. Each secret share backup material output (e.g., for the four generated secret shares) is distributed to a different geographic location and stored there in a secure location (e.g., a bank's vault).

For a seed recovery using 2-of-4 backup scheme, two shares from any two locations are sufficient to recover the seed. Similarly, in order to steal the seed, an attacker would have to successfully compromise at least two storage locations, which is more complicated than a single storage location. The seed becomes unrecoverable if at least three shares are completely destroyed, which is very unlikely even in case of a major disaster recovery.

FIG. 17 shows a screenshot diagram illustrating embodiments of the SFTSP. In FIG. 17, an exemplary interactive command-line interface (CLI) of a backup utility is illustrated. In one implementation, upon generating a master key on a HSM, the master key may be split into master key shares inside the HSM. Each share may be exported to an air-gapped key-generation workstation and printed out one at a time such that the shares are not in the workstation's RAM at the same time.

Figure 18:
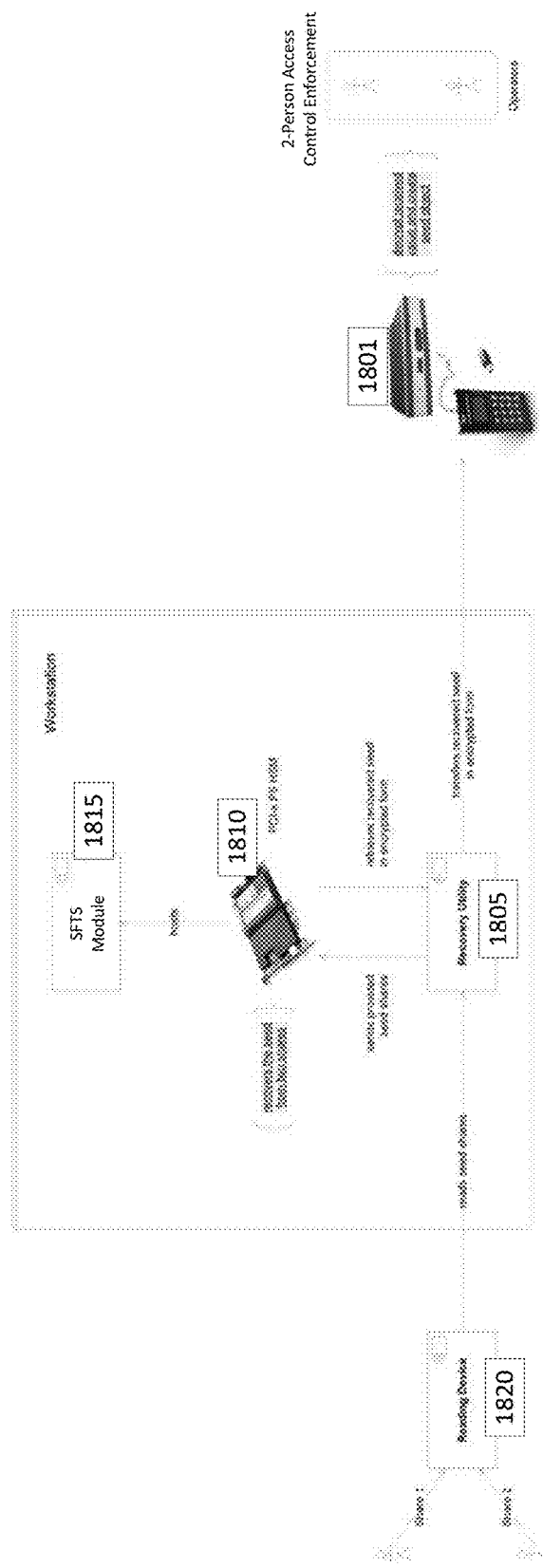
FIG. 18 shows an exemplary key recovery model for the SFTSP.

FIG. 18 shows an exemplary key recovery model for the SFTSP. In FIG. 18, a seed (e.g., master key) may be recovered from seed shares. Seed shares utilized to recover the seed (e.g., a minimum number of seed shares) may be transferred from their storage locations to a recovery center. Operators participating in the key recovery process may enter the seed shares into a reading device 1820 (e.g., each operator may hold and enter a single seed via a barcode reader, keyboard, USB drive, hard drive, portable HSM, etc.), and the reading device may transfer the seed shares to a recovery utility 1805. The recovery utility may request that a seed hosting HSM 1801 (e.g., Gemalto's G5 HSM), which will host the recovered seed and which supports M-of-N authentication, generate a RSA key pair and provide the generated public key. Operators may approve the key pair generation and seed recovery process by authenticating to an authentication entry device associated with the hosting HSM (e.g., using 2-of-3 access control enforcement). The recovery utility may export the generated RSA public key from the hosting HSM and import it into a backup HSM 1810 (e.g., Gemalto's ProtectServer PCI-e HSM), which supports firmware module extensions and hosts SFTS module 1815. The recovery utility may utilize an API call to provide the entered seed shares to the backup HSM and to request recovery of the seed from the provided shares. The backup HSM may recover the seed using an implemented secret recovery method. See FIG. 14 for an example of a secret recovery method. The backup HSM may encrypt the recovered seed using the provided RSA public key and may return the encrypted seed to the recovery utility. The recovery utility may transfer the encrypted seed to the hosting HSM. The hosting HSM may decrypt the seed using the previously generated RSA private key and may store the seed in the hosting HSM. Thus, the full seed is not exposed in decrypted form outside of an HSM device (e.g., in RAM of the host workstation) during the key recovery process, which eliminates the risk of memory-attack theft. As M-of-N shares may be utilized to recover the seed, the redundancy of backup stores is further increased. For example, in a 2-of-4 backup scheme, 4 shares may be stored at four regions separately. If one or two regions are destroyed, shares from the other two regions can still be used to recover the full seed.

Figure 19:
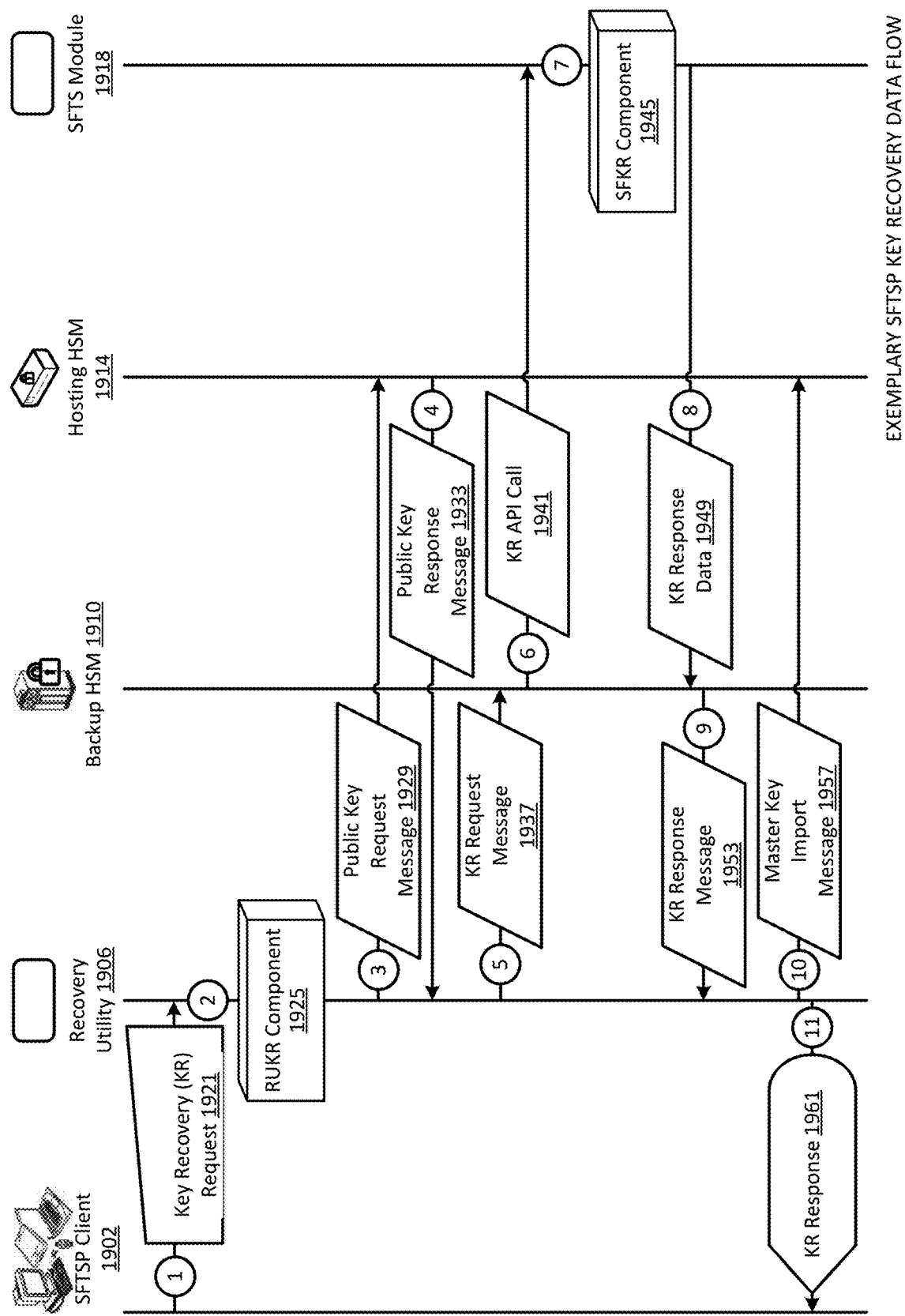
FIG. 19 shows a datagraph diagram illustrating embodiments of a data flow for the SFTSP.

FIG. 19 shows a datagraph diagram illustrating embodiments of a data flow for the SFTSP. In FIG. 19, a user of a SFTSP client 1902 may send a key recovery request 1921 to a recovery utility 1906 to facilitate key recovery (e.g., of a master key associated with a hierarchical deterministic wallet). For example, the SFTSP client may be a desktop, a laptop, a tablet, a smartphone, and/or the like that is executing the recovery utility (e.g., the recovery utility may be the same application as the backup utility or a separate application). In one implementation, the key recovery request may include parameters specified by the user (e.g., via a UI of the recovery utility) such as a request type (e.g., backup master key, recover master key), a wallet identifier (e.g., of the wallet whose master key should be recovered), the number of master key shares sufficient to recover the master key, master key shares (e.g., entered via a reading device), and/or the like.

A recovery utility key recovery (RUKR) component 1925 may utilize parameters provided in the key recovery request to facilitate recovery of the relevant master key (e.g., for the specified wallet). See FIG. 20 for additional details regarding the RUKR component.

The recovery utility may send a public key request message 1929 to a hosting HSM 1914 to request a RSA public key from the hosting HSM. In one implementation, the public key request message may include data such as a request identifier, a recovery request identifier, and/or the like. In one embodiment, the recovery utility may provide the following example public key request message, substantially in the form of a HTTP(S) POST message including XML-formatted data, as provided below:

POST /public_key_request_message.php HTTP/1.1
Host: localhost

-continued

```
Content-Type: Application/XML
Content-Length: 667
<?XML version = "1.0" encoding = "UTF-8"?>
<public_key_request_message>
    <request_identifier>ID_request_21</request_identifier>
    <recovery_request_identifier>ID_recovery_request_1</recovery_request_identifier>
</public_key_request_message>
```

The hosting HSM may provide a RSA public key to the recovery utility via a public key response message 1933. In one implementation, the public key response message may include data such as a response identifier, a recovery request identifier, a RSA public key, and/or the like. In one embodiment, the hosting HSM may provide the following example public key response message, substantially in the form of a HTTP(S) POST message including XML-formatted data, as provided below:

```
POST /public_key_response_message.php HTTP/1.1
Host: localhost
Content-Type: Application/XML
Content-Length: 667
<?XML version = "1.0" encoding = "UTF-8"?>
<public_key_response_message>
    <response_identifier>ID_response_21</response_identifier>
    <recovery_request_identifier>ID_recovery_request_1</recovery_request_identifier>
    <RSA_public_key>RSA public key provided by the hosting HSM</RSA_public_key>
</public_key_response_message>
```

The recovery utility may send a key recovery request message 1937 to a backup HSM 1910 to request recovery of a master key (e.g., for the specified wallet) from the backup HSM. In one implementation, the key recovery request message may include data such as a request identifier, a request type, a recovery request identifier, a RSA public key, the number of master key shares sufficient to recover the master key, master key shares, and/or the like. In one embodiment, the recovery utility may provide the following example key recovery request message, substantially in the form of a HTTP(S) POST message including XML-formatted data, as provided below:

```
POST /key_recovery_request_message.php HTTP/1.1
Host: localhost
Content-Type: Application/XML
Content-Length: 667
<?XML version = "1.0" encoding = "UTF-8"?>
<key_recovery_request_message>
    <request_identifier>ID_request_22</request_identifier>
    <request_type>RECOVER_MASTER_KEY</request_type>
    <recovery_request_identifier>ID_recovery_request_1</recovery_request_identifier>
    <RSA_public_key>RSA public key provided by the hosting HSM</RSA_public_key>
    <number_of_shares_sufficient_to_recover>2</number_of_shares_sufficient_to_recover>
    <master_key_shares>
      <share>0_1D7927D78EAD692BB1694497180C66B3E88676F22B920625EDECAA1728F2921E5E309297B76FE658B61DF9D501B49FB553255DFDC8FE966F2950DDD0078C809B02</share>
      <share>1_01658051EB654BBD692013E6E5FB6BA2D9C36980AE0D592D4D07516910646EE05B223C3C13C1DF6736232724DF32644791E4A1217DD642C8A7C0A240311DBD1172FE</share>
    </master_key_shares>
</key_recovery_request_message>
```

The backup HSM may make a key recovery API call 1941 to a SFTS module 1918 to request that the SFTS module recover the master key from the master key shares. In one implementation, the key recovery API call may include data such as a request type (e.g., backup master key, recover master key), a RSA public key, the number of master key shares sufficient to recover the master key, master key shares, and/or the like.

Data provided in the key recovery API call may be used by a secure firmware key recovery (SFKR) component 1945 to recover the master key from the master key shares. See FIG. 21 for additional details regarding the SFKR component.

The SFTS module may send key recovery response data 1949 to the backup HSM in response to the key recovery API call. In one implementation, the key recovery response data may include an encrypted recovered master key.

The backup HSM may send a key recovery response message 1953 to the recovery utility. In one implementation, the key recovery response message may include data such as a response identifier, a recovery request identifier, the encrypted recovered master key, and/or the like. In one embodiment, the backup HSM may provide the following example key recovery response message, substantially in the form of a HTTP(S) POST message including XML-formatted data, as provided below:

```
POST /key_recovery_response_message.php HTTP/1.1
Host: localhost
Content-Type: Application/XML
Content-Length: 667
<?XML version = "1.0" encoding = "UTF-8"?>
<key_recovery_response_message>
    <response_identifier>ID_response_22</response_identifier>
    <recovery_request_identifier>ID_recovery_request_1</recovery_request_identifier>
    <master_key>encrypted recovered master key provided by the backup HSM</master_key>
</key_recovery_response_message>
```

The recovery utility may send a master key import message 1957 to the hosting HSM to import the recovered master key into the hosting HSM. In one implementation, the master key import message may include data such as a request identifier, a recovery request identifier, a wallet identifier, the encrypted recovered master key, and/or the like. For example, the hosting HSM may decrypt and/or store the recovered master key for the specified wallet. In one embodiment, the recovery utility may provide the following example master key import message, substantially in the form of a HTTP(S) POST message including XML-formatted data, as provided below:

```
POST /master_key_import_message.php HTTP/1.1
Host: localhost
Content-Type: Application/XML
Content-Length: 667
<?XML version = "1.0" encoding = "UTF-8"?>
<master_key_import_message>
    <request_identifier>ID_request_23</request_identifier>
    <recovery_request_identifier>ID_recovery_request_1</recovery_request_identifier>
    <wallet_identifier>ID_Wallet1</wallet_identifier>
    <master_key>encrypted recovered master key provided by the backup HSM</master_key>
</master_key_import_message>
```

The recovery utility may send a key recovery response 1961 to the user. For example, the key recovery response may be used to inform the user whether the key recovery was completed successfully (e.g., via a UI of the recovery utility).

Figure 20:
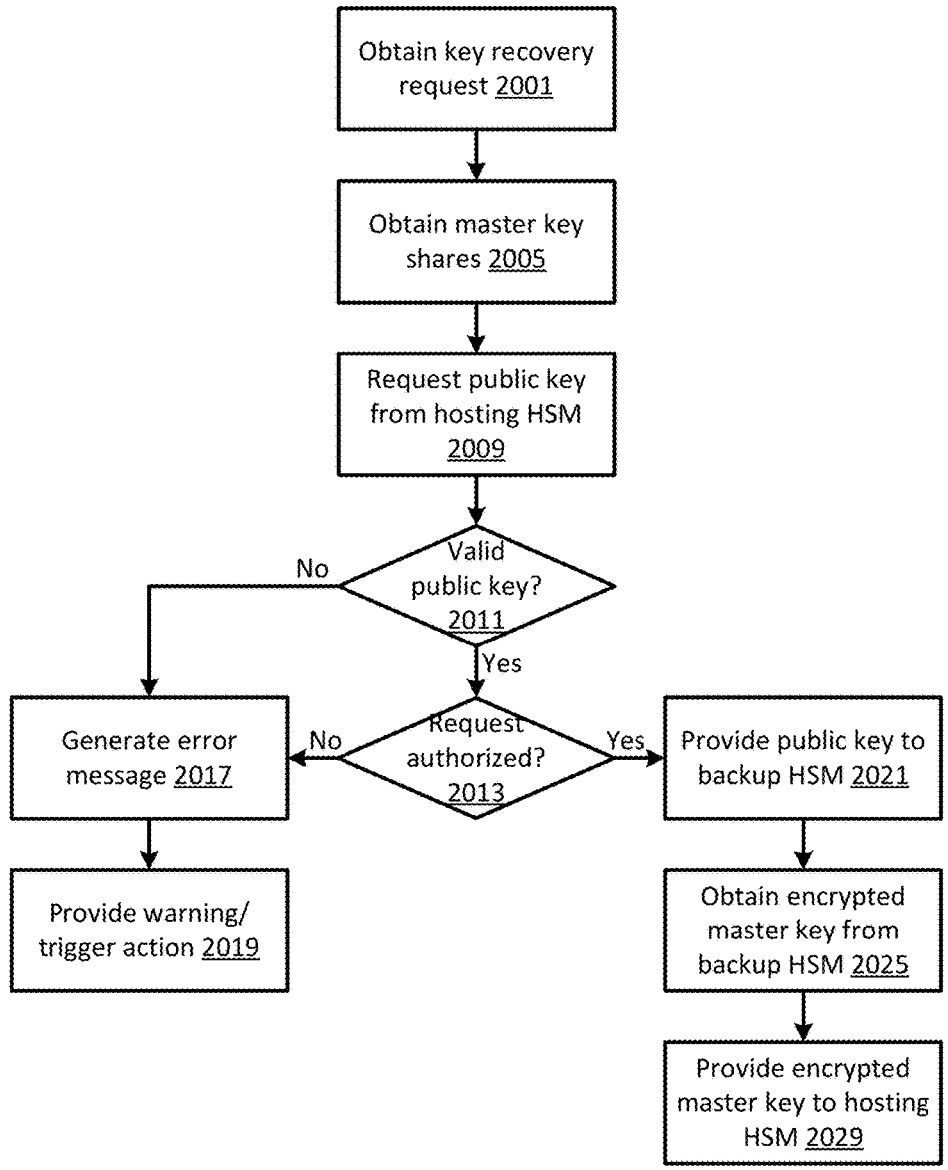
FIG. 20 shows a logic flow diagram illustrating embodiments of a recovery utility key recovery (RUKR) component for the SFTSP.

FIG. 20 shows a logic flow diagram illustrating embodiments of a recovery utility key recovery (RUKR) component for the SFTSP. In FIG. 20, a key recovery request may be obtained at 2001. For example, the key recovery request may be obtained as a result of a user utilizing a UI of a recovery utility to initiate key recovery of a master key associated with a hierarchical deterministic wallet. See FIG. 22 for an example of a UI that may be utilized by the user.

Master key shares utilized to recover the master key (e.g., a minimum number of master key shares sufficient to recover the master key) may be obtained at 2005. In one implementation, the master key shares may be obtained from operators participating in the key recovery process via a reading device. In one implementation, the master key shares may be forwarded to a backup HSM via a key recovery request message.

A RSA public key may be requested from a hosting HSM at 2009. In one implementation, a public key request message may be sent to the hosting HSM to request the RSA public key.

A determination may be made at 2011 whether the obtained RSA public key is valid. For example, the recovery utility may be configured to work with a specified set of hosting HSMs, and the obtained RSA public key may have to be associated with one of the specified hosting HSMs to be valid.

If the obtained RSA public key is not valid, an error message may be generated at 2017. For example, the error message may specify the error that occurred (e.g., RSA public key is not valid). A warning message may be provided to the user and/or an action may be triggered at 2019. In one implementation, a warning message based on the generated error message may be provided to the user to inform the user regarding the error. In another implementation, an action may be triggered based on a specified condition (e.g., invalid RSA public key obtained three times). For example, the triggered action may be to erase data associated with the wallet. In another example, the triggered action may be to invalidate the master key and to generate a new master key.

If the obtained RSA public key is valid, a determination may be made at 2013 whether the key recovery request is authorized. In one implementation, one or more operators (e.g., based on M-of-N authentication) may have to approve (e.g., via an authentication entry device associated with the hosting HSM) the request to recover the master key and to import it into the hosting HSM.

If the key recovery request is not authorized, an error message may be generated at 2017. For example, the error message may specify the error that occurred (e.g., key recovery request is not authorized). A warning message may be provided to the user and/or an action may be triggered at 2019. In one implementation, a warning message based on the generated error message may be provided to the user to inform the user regarding the error. In another implementation, an action may be triggered based on a specified condition (e.g., unauthorized request occurred three times). For example, the triggered action may be to erase data associated with the wallet. In another example, the triggered action may be to invalidate the master key and to generate a new master key.

If the key recovery request is authorized, the RSA public key may be provided to the backup HSM at 2021. For example, the RSA public key may be utilized by the backup HSM to encrypt the recovered master key such that the corresponding RSA private key, available to the hosting HSM, may be used to decrypt the recovered master key. In one implementation, the RSA public key may be forwarded to the backup HSM via the key recovery request message.

The encrypted recovered master key (e.g., for the specified wallet) may be obtained from the backup HSM at 2025. In one implementation, the encrypted recovered master key may be obtained via a key recovery response message sent by the backup HSM.

The encrypted master key may be provided to the hosting HSM at 2029. For example, the hosting HSM may decrypt and/or store the recovered master key for the specified wallet. In one implementation, the encrypted master key may be forwarded to the hosting HSM via a master key import message.

Figure 21:
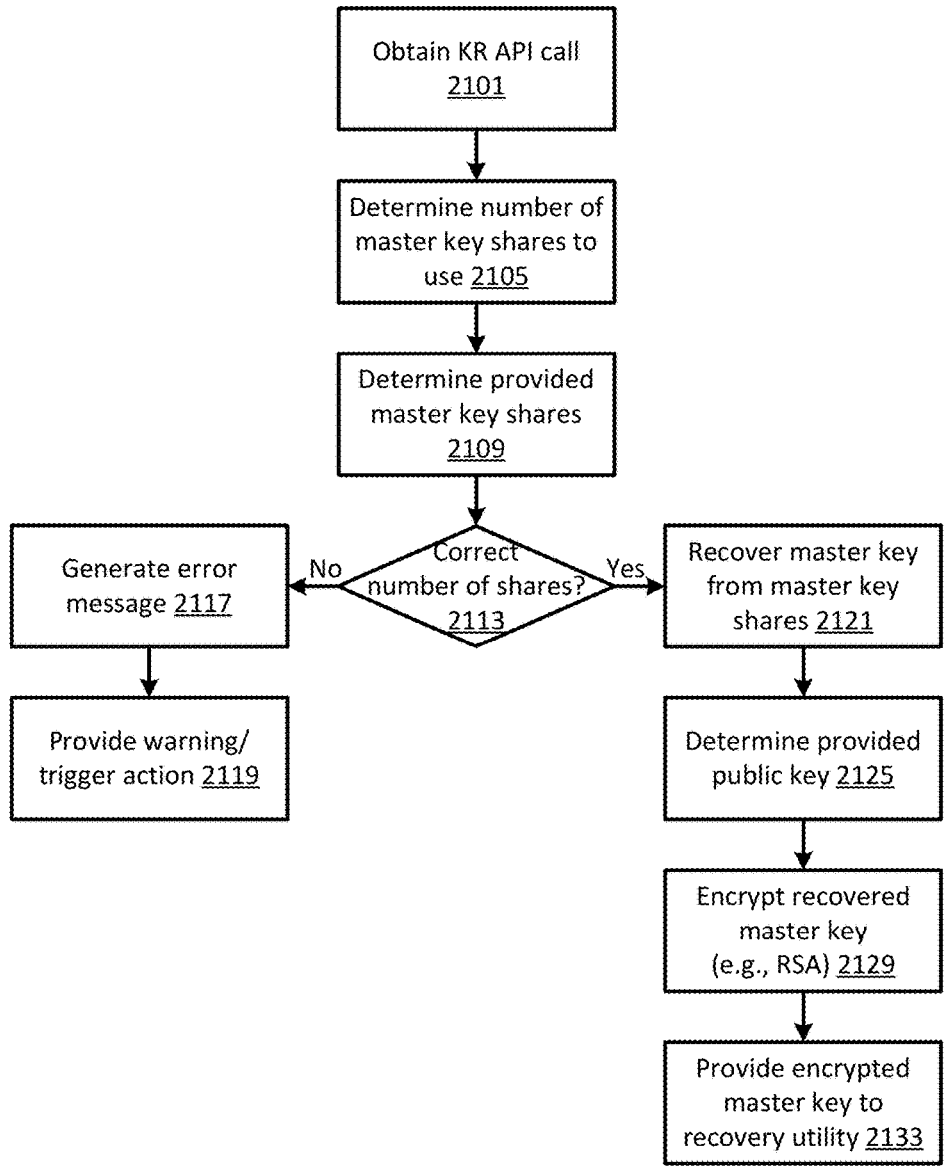
FIG. 21 shows a logic flow diagram illustrating embodiments of a secure firmware key recovery (SFKR) component for the SFTSP.

FIG. 21 shows a logic flow diagram illustrating embodiments of a secure firmware key recovery (SFKR) component for the SFTSP. In FIG. 21, a key recovery API call may be obtained at 2101. For example, the key recovery API call may be obtained as a result of a call from a backup HSM (e.g., based on receiving a key recovery request message from a recovery utility) associated with the SFKR component. In one embodiment, the following API method may be available to the backup HSM and/or to the recovery utility:

CombineSeedShares - this method returns a 512-bit master key value restored from provided master key shares and encrypted with an RSA public key generated by the hosting HSM. The SFKR component uses provided master key shares to restore the full master key value according to the secret sharing algorithm used in the implementation.
  Input:
    subarray of master key shares sufficient to recover the master key (M master key shares)
  Output:
    512-bit master key value encrypted with an RSA public key generated
by the hosting HSM In one implementation, a C implementation of this method for M-of-N key split may have the following interface:

```
CombineSeedShares(CK_ULONG slot_id,
    const char *pin,
    CK_BYTE_PTR pShares,
    CK_ULONG shares_num,
    CK_BYTE_PTR *phSeed,
    CK_ULONG_PTR phSeed_len)
```

The following table describes input and output parameters:

| Name | Input/Output | Type | Description | Sample Values |
|---|---|---|---|---|
| slot_id | In | CK_ULONG | Identifier of the target slot inside HSM | 0 |
| pin | In | const char * | User PIN for HSM | 0123 |
| pShares | In | CK_BYTE_PTR | Pointer to the byte array containing the list of secret shares along with their indices | |
| shares_num | In | CK_ULONG | Number of secret shares submitted for master key recovery | 5 |
| phSeed | Out | CK_BYTE_PTR * | Pointer to the pointer to a byte array containing the handle to the recovered full master key | |
| phSeed_len | Out | CK_ULONG_PTR | Pointer to a long number containing the length of the byte array containing the handle to the recovered master key | |

The number of master key shares to use (e.g., the number of master key shares sufficient to recover the master key) may be determined at 2105. In one implementation, this data may be provided as an input parameter in the key recovery API call. In another implementation, this determination may be made via an internal call on a HSM environment setting.

The provided master key shares may be determined at 2109. In one implementation, this data may be provided as input parameters in the key recovery API call.

A determination may be made at 2113 whether the correct number of master key shares was provided. In one implementation, this determination may be made by checking whether the number of provided master key shares matches the number of master key shares to use.

If an incorrect number of master key shares was provided, an error message may be generated at 2117. For example, the error message may specify the error that occurred (e.g., incorrect number of master key shares is provided). A warning message may be provided to a user and/or an action may be triggered at 2119. In one implementation, a warning message based on the generated error message may be provided to the user (e.g., via the recovery utility) to inform the user regarding the error. In another implementation, an action may be triggered based on a specified condition (e.g., incorrect number of master key shares provided three times). For example, the triggered action may be to erase data associated with the wallet. In another example, the triggered action may be to invalidate the master key and to generate a new master key.

If the correct number of master key shares is provided, a master key may be recovered from the provided master key shares at 2121. In one embodiment, a method such as Shamir's Secret Sharing may be utilized to recover the master key from the master key shares based on the specified number of master key shares to use. See FIG. 14 for additional details regarding utilizing Shamir's Secret Sharing. For example, in a 2-of-4 backup scheme, any arbitrary two shares can be used to reconstruct the original full master key.

The provided RSA public key may be determined at 2125. In one implementation, the RSA public key may be provided as an input parameter in the key recovery API call.

The recovered master key may be encrypted using the RSA public key at 2129. In one implementation, the recovered master key may be encrypted using a PKCS#11 function (e.g., C_Encrypt( . . . )).

The encrypted recovered master key may be provided to the recovery utility at 2133. In one implementation, the encrypted recovered master key may be provided to the recovery utility via a key recovery response message.

FIG. 22 shows a screenshot diagram illustrating embodiments of the SFTSP. In FIG. 22, an exemplary interactive CLI of a recovery utility is illustrated. In one implementation, recovery of a master key may involve several users (operators) who authenticate to the involved devices using multi-factor authentication. For example, master key shares' indices and values may have to be manually entered (e.g., twice).

SFTSP Controller

Figure 23:
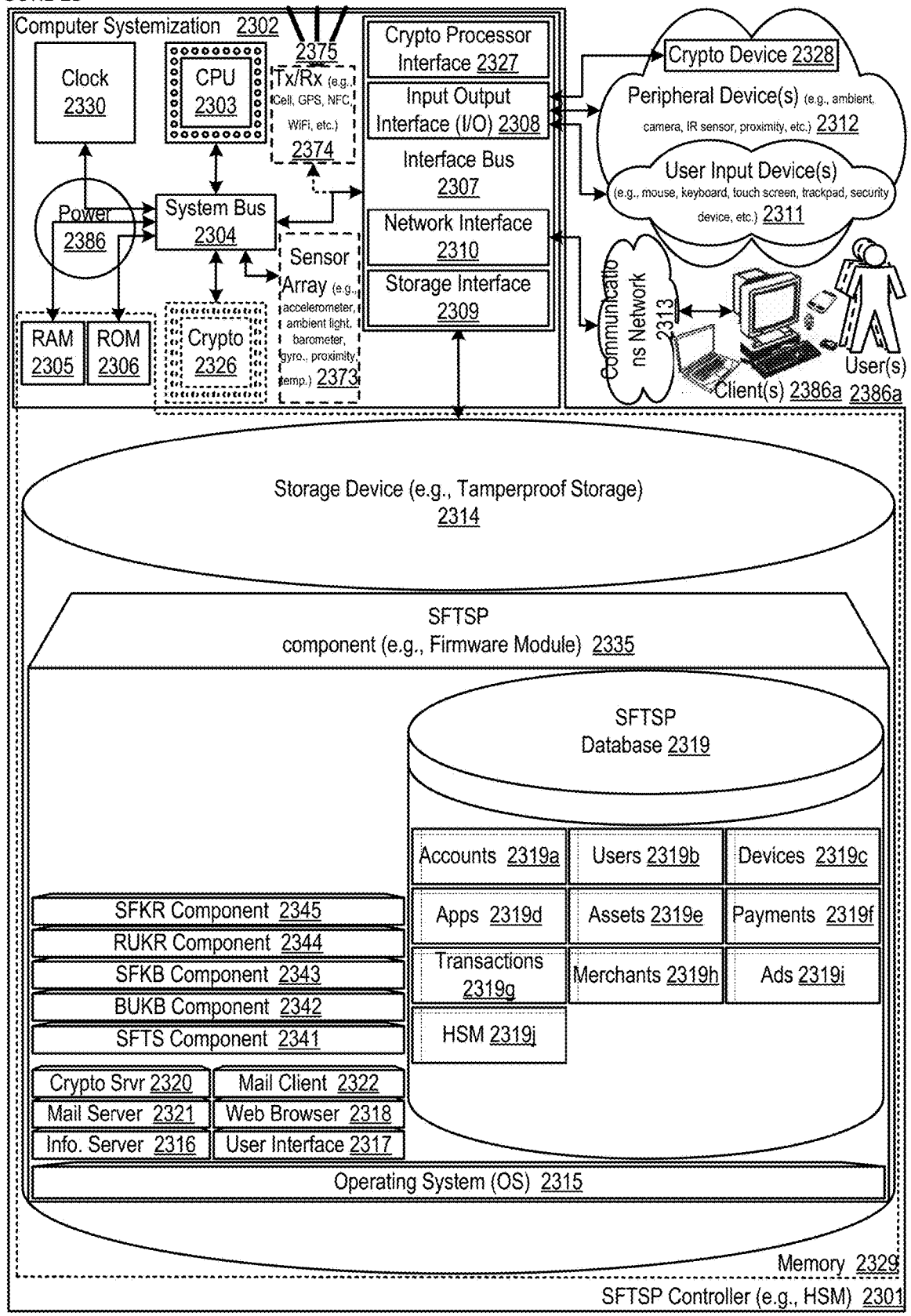
FIG. 23 shows a block diagram illustrating embodiments of a SFTSP controller.

FIG. 23 shows a block diagram illustrating embodiments of a SFTSP controller. In this embodiment, the SFTSP controller 2301 may serve to aggregate, process, store, search, serve, identify, instruct, generate, match, and/or facilitate interactions with a computer through information technology technologies, and/or other related data.

Typically, users, which may be people and/or other systems, may engage information technology systems (e.g., computers) to facilitate information processing. In turn, computers employ processors to process information; such processors 2303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program.

These information technology systems provide interfaces that allow users to access and operate various system components.

In one embodiment, the SFTSP controller 2301 may be connected to and/or communicate with entities such as, but not limited to: one or more users from peripheral devices 2312 (e.g., user input devices 2311); an optional cryptographic processor device 2328; and/or a communications network 2313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SFTSP controller 2301 may be based on computer systems that may comprise, but are not limited to, components such as: a computer systemization 2302 connected to memory 2329.

Computer Systemization

A computer systemization 2302 may comprise a clock 2330, central processing unit ("CPU(s)" and/or "processor(s)" (these terms are used interchangeable throughout the disclosure unless noted to the contrary)) 2303, a memory 2329 (e.g., a read only memory (ROM) 2306, a random access memory (RAM) 2305, etc.), and/or an interface bus 2307, and most frequently, although not necessarily, are all interconnected and/or communicating through a system bus 2304 on one or more (mother)board(s) 2302 having conductive and/or otherwise transportive circuit pathways through which instructions (e.g., binary encoded signals) may travel to effectuate communications, operations, storage, etc. The computer systemization may be connected to a power source 2386; e.g., optionally the power source may be internal. Optionally, a cryptographic processor 2326 may be connected to the system bus. In another embodiment, the cryptographic processor, transceivers (e.g., ICs) 2374, and/or sensor array (e.g., accelerometer, altimeter, ambient light, barometer, global positioning system (GPS) (thereby allowing SFTSP controller to determine its location), gyroscope, magnetometer, pedometer, proximity, ultra-violet sensor, etc.) 2373 may be connected as either internal and/or external peripheral devices 2312 via the interface bus I/O 2308 (not pictured) and/or directly via the interface bus 2307. In turn, the transceivers may be connected to antenna(s) 2375, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11 ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SFTSP controller and beyond through various interfaces. Should processing requirements dictate a greater amount speed and/or capacity, distributed processors (e.g., see Distributed SFTSP below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SFTSP may be achieved by implementing a microcontroller such as CAST's R8051XC2 microcontroller; Intel's MCS 51 (i.e., 8051 microcontroller); and/or the like. Also, to implement certain features of the SFTSP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SFTSP component collection (distributed or otherwise) and/or features may be implemented via the microprocessor and/or via embedded components; e.g., via ASIC, coprocessor, DSP, FPGA, and/or the like. Alternately, some implementations of the SFTSP may be implemented with embedded components that are configured and used to achieve a variety of features or signal processing.

Depending on the particular implementation, the embedded components may include software solutions, hardware solutions, and/or some combination of both hardware/software solutions. For example, SFTSP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SFTSP features. A hierarchy of programmable interconnects allow logic blocks to be interconnected as needed by the SFTSP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SFTSP may be developed on regular FPGAs and then migrated into a fixed version that more resembles ASIC implementations. Alternate or coordinating implementations may migrate SFTSP controller features to a final ASIC instead of or in addition to FPGAs. Depending on the implementation all of the aforementioned embedded components and microprocessors may be considered the "CPU" and/or "processor" for the SFTSP.

Power Source

The power source 2386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2386 is connected to at least one of the interconnected subsequent components of the SFTSP thereby providing an electric current to all subsequent components. In one example, the power source 2386 is connected to the system bus component 2304. In an alternative embodiment, an outside power source 2386 is provided through a connection across the I/O 2308 interface. For example, a USB and/or IEEE 1394 connection carries both data and power across the connection and is therefore a suitable source of power.

Interface Adapters

Interface bus(ses) 2307 may accept, connect, and/or communicate to a number of interface adapters, conventionally although not necessarily in the form of adapter cards, such as but not limited to: input output interfaces (I/O) 2308, storage interfaces 2309, network interfaces 2310, and/or the like. Optionally, cryptographic processor interfaces 2327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2309 may accept, communicate, and/or connect to a number of storage devices such as, but not limited to: storage devices 2314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2310 may accept, communicate, and/ or connect to a communications network 2313. Through a communications network 2313, the SFTSP controller is accessible through remote clients 2333*b* (e.g., computers with web browsers) by users 2333*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SFTSP below), architectures may similarly be employed to pool, load balance, and/or otherwise decrease/increase the communicative bandwidth required by the SFTSP controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2310 may be used to engage with various communications network types 2313. For example, multiple network interfaces may be employed to allow for the communication over broadcast, multicast, and/or unicast networks.

Input Output interfaces (I/O) 2308 may accept, communicate, and/or connect to user, peripheral devices 2312 (e.g., input devices 2311), cryptographic processor devices 2328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2312 may be connected and/or communicate to I/O and/or other facilities of the like such as network interfaces, storage interfaces, directly to the interface bus, system bus, the CPU, and/or the like. Peripheral devices may be external, internal and/or part of the SFTSP controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2311 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SFTSP controller may be embodied as an embedded, dedicated, and/or monitor-less (i.e., headless) device, wherein access would be provided over a network interface connection.

Cryptographic units such as, but not limited to, microcontrollers, processors 2326, interfaces 2327, and/or devices 2328 may be attached, and/or communicate with the SFTSP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2329. However, memory is a fungible technology and resource, thus, any number of memory embodiments may be employed in lieu of or in concert with one another. It is to be understood that the SFTSP controller and/or a computer systemization may employ various forms of memory 2329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2329 will include ROM 2306, RAM 2305, and a storage device 2314. A storage device 2314 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2329 may contain a collection of program and/or database components and/or data such as, but not limited to: operating system component(s) 2315 (operating system); information server component(s) 2316 (information server); user interface component(s) 2317 (user interface); Web browser component(s) 2318 (Web browser); database(s) 2319; mail server component(s) 2321; mail client component(s) 2322; cryptographic server component(s) 2320 (cryptographic server); the SFTSP component(s) 2335; and/or the like (i.e., collectively a component collection). These components may be stored and accessed from the storage devices and/or from storage devices accessible through an interface bus. Although non-conventional program components such as those in the component collection, typically, are stored in a local storage device 2314, they may also be loaded and/or stored in memory such as: peripheral devices, RAM, remote storage facilities through a communications network, ROM, various forms of memory, and/or the like.

Operating System

The operating system component 2315 is an executable program component facilitating the operation of the SFTSP controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SFTSP controller to communicate with other entities through a communications network 2313. Various communication protocols may be used by the SFTSP controller as a subcarrier transport mechanism for interaction, such as, but not limited to: multicast, TCP/IP, UDP, unicast, and/or the like.

Information Server

An information server component 2316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SFTSP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SFTSP database 2319, operating systems, other program components, user interfaces, Web browsers, and/or the like.

Access to the SFTSP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SFTSP. In one embodiment, the information server would provide a Web form accessible by a Web browser.

Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SFTSP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2318 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SFTSP enabled nodes. The combined application may be nugatory on systems employing standard Web browsers.

Mail Server

A mail server component 2321 is a stored program component that is executed by a CPU 2303. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SFTSP. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SFTSP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2322 is a stored program component that is executed by a CPU 2303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2320 is a stored program component that is executed by a CPU 2303, cryptographic processor 2326, cryptographic processor interface 2327, cryptographic processor device 2328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SFTSP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SFTSP component to engage in secure transactions if so desired. The cryptographic component facilitates the secure accessing of resources on the SFTSP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SFTSP Database

The SFTSP database component 2319 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SFTSP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SFTSP database is implemented as a data-structure, the use of the SFTSP database 2319 may be integrated into another component such as the SFTSP component 2335. Also, the database may be implemented as a mix of data structures, objects, and relational structures. Databases may be consolidated and/or distributed in countless variations (e.g., see Distributed SFTSP below). Portions of databases, e.g., tables, may be exported and/or imported and thus decentralized and/or integrated.

In one embodiment, the database component 2319 includes several tables 2319*a-j:*

An accounts table 2319*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountUR- LAccessCode, accountPortNo, accountAuthorizationCode, accountAccessPrivileges, accountPreferences, accountRestrictions, and/or the like;

A users table 2319b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SFTSP);

An devices table 2319c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2319d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2319e includes fields such as, but not limited to: assetID, accountID, userID, distributorAccountID, distributorPaymentID, distributorOnwerID, assetOwnerID, assetType, assetSourceDeviceID, as setSourceDeviceType, as setSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 2319f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2319g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2319h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAcces sPrivileges, merchantPreferences, merchantRestrictions, and/or the like;

An ads table 2319i includes fields such as, but not limited to: adID, advertiserID, adMerchantID, adNetworkD, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A HSM table 2319j includes fields such as, but not limited to: HSM_ID, walletID, masterPrivateKey, masterPublicKey, privateKeyDecryptionKey, publicKeyEncryptionKey, isPortableHSM_Utilized, associatedHSM_ID, and/or the like.

In one embodiment, the SFTSP database may interact with other database systems. For example, employing a distributed database system, queries and data access by search SFTSP component may treat the combination of the SFTSP database, an integrated data security layer database as a single database entity (e.g., see Distributed SFTSP below).

In one embodiment, user programs may contain various user interface primitives, which may serve to update the SFTSP. Also, various accounts may require custom database tables depending upon the environments and the types of clients the SFTSP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2319a-j. The SFTSP may be configured to keep track of various settings, inputs, and parameters via database controllers.

The SFTSP database may communicate to and/or with other components in a component collection, including itself, and/or facilities of the like. Most frequently, the SFTSP database communicates with the SFTSP component, other program components, and/or the like. The database may contain, retain, and provide information regarding other nodes and data.

The SFTSPs

The SFTSP component 2335 is a stored program component that is executed by a CPU. In one embodiment, the SFTSP component incorporates any and/or all combinations of the aspects of the SFTSP that was discussed in the previous figures. As such, the SFTSP affects accessing, obtaining and the provision of information, services, transactions, and/or the like across various communications networks. The features and embodiments of the SFTSP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SFTSP's features and facilities, and in many cases reduce the costs, energy consumption/requirements, and extend the life of SFTSP's underlying infrastructure; this has the added benefit of making the SFTSP more reliable. Similarly, many of the features and mechanisms are designed to be easier for users to use and access, thereby broadening the audience that may enjoy/employ and exploit the feature sets of the SFTSP; such ease of use also helps to increase the reliability of the SFTSP. In addition, the feature sets include heightened security as noted via the Cryptographic components 2320, 2326, 2328 and throughout, making access to the features and data more reliable and secure The SFTSP transforms transaction signing request, key backup request, key recovery request inputs, via SFTSP components (e.g., SFTS, BUKB, SFKB, RUKR, SFKR), into transaction signing response, key backup response, key recovery response outputs.

The SFTSP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SFTSP server employs a cryptographic server to encrypt and decrypt communications. The SFTSP component may communicate to and/or with other components in a component collection, including itself, and/or facilities of the like. Most frequently, the SFTSP component communicates with the SFTSP database, operating systems, other program components, and/or the like. The SFTSP may contain, communicate, generate, obtain, and/or provide program component, system, user, and/or data communications, requests, and/or responses.

Distributed SFTSPs

The structure and/or operation of any of the SFTSP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SFTSP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for SFTSP controller and/or SFTSP component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SFTSP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. A transaction signing apparatus, comprising:
a memory;
a component collection in the memory, including:
   a secure firmware transaction signing component implemented by a first hardware security module (HSM);
a processor disposed in communication with the memory, and configured to issue a plurality of processing instructions from the component collection stored in the memory,
wherein the processor issues instructions from the secure firmware transaction signing component, stored in the memory, to:
   receive, via at least one processor, a transaction signing request message for a transaction;
   obtain, via at least one processor, an encrypted master private key associated with the transaction from a second HSM;
   retrieve, via at least one processor, from the first HSM's tamper-proof storage, a private key decryption key associated with the first HSM;
   decrypt, via at least one processor, by the first HSM, the encrypted master private key using the retrieved private key decryption key;
   determine, via at least one processor, a transaction hash and a keychain path associated with the transaction signing request message;
   generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

2. The apparatus of embodiment 1, wherein the first HSM is a PCIe appliance installed in a transaction signing server.

3. The apparatus of embodiment 1, wherein the second HSM is a USB appliance communicatively coupled to the first HSM via USB.

4. The apparatus of embodiment 1, wherein the second HSM includes a pin entry device.

5. The apparatus of embodiment 4, wherein the second HSM provides the encrypted master private key to the first HSM upon obtaining separate credentials from a predetermined number of people.

6. The apparatus of embodiment 1, wherein the second HSM also implements a secure firmware transaction signing component.

7. The apparatus of embodiment 1, wherein the transaction signing request is an API call to a method exposed by the secure firmware transaction signing component.

8. The apparatus of embodiment 1, wherein the encrypted master private key is encrypted, by the second HSM, using a public key encryption key of the first HSM stored in the second HSM's tamper-proof storage.

9. The apparatus of embodiment 1, wherein the signing private key is generated using a Bip32-based deterministic key derivation procedure.

10. The apparatus of embodiment 1, further, comprising:
the processor issues instructions from the secure firmware transaction signing component, stored in the memory, to:
wipe, via at least one processor, temporary private key data from the memory after generating the signature.

11. The apparatus of embodiment 10, wherein the temporary private key data includes the encrypted master private key, the decrypted master private key, and the generated signing private key.

12. The apparatus of embodiment 1, wherein the transaction hash is signed in accordance with the hashing algorithm utilized by the Bitcoin protocol.

13. The apparatus of embodiment 1, wherein the signature is returned in Distinguished Encoding Rules format.

14. A processor-readable transaction signing non-transient physical medium storing processor-executable components, the components, comprising:
a component collection stored in the medium, including:
a secure firmware transaction signing component implemented by a first hardware security module (HSM);
wherein the secure firmware transaction signing component, stored in the medium, includes processor-issuable instructions to:
receive, via at least one processor, a transaction signing request message for a transaction;
obtain, via at least one processor, an encrypted master private key associated with the transaction from a second HSM;
retrieve, via at least one processor, from the first HSM's tamper-proof storage, a private key decryption key associated with the first HSM;
decrypt, via at least one processor, by the first HSM, the encrypted master private key using the retrieved private key decryption key;
determine, via at least one processor, a transaction hash and a keychain path associated with the transaction signing request message;

generate, via at least one processor, by the first HSM, a signing private key for the determined keychain path using the decrypted master private key;
sign, via at least one processor, by the first HSM, the determined transaction hash using the generated signing private key to generate a signature; and
return, via at least one processor, the generated signature.

15. The medium of embodiment 14, wherein the first HSM is a PCIe appliance installed in a transaction signing server.

16. The medium of embodiment 14, wherein the second HSM is a USB appliance communicatively coupled to the first HSM via USB.

17. The medium of embodiment 14, wherein the second HSM includes a pin entry device.

18. The medium of embodiment 17, wherein the second HSM provides the encrypted master private key to the first HSM upon obtaining separate credentials from a predetermined number of people.

19. The medium of embodiment 14, wherein the second HSM also implements a secure firmware transaction signing component.

20. The medium of embodiment 14, wherein the transaction signing request is an API call to a method exposed by the secure firmware transaction signing component.

21. The medium of embodiment 14, wherein the encrypted master private key is encrypted, by the second HSM, using a public key encryption key of the first HSM stored in the second HSM's tamper-proof storage.

22. The medium of embodiment 14, wherein the signing private key is generated using a Bip32-based deterministic key derivation procedure.

23. The medium of embodiment 14, further, comprising: the secure firmware transaction signing component, stored in the medium, includes processor-issuable instructions to:
wipe, via at least one processor, temporary private key data from the memory after generating the signature.

24. The medium of embodiment 23, wherein the temporary private key data includes the encrypted master private key, the decrypted master private key, and the generated signing private key.

25. The medium of embodiment 14, wherein the transaction hash is signed in accordance with the hashing algorithm utilized by the Bitcoin protocol.

26. The medium of embodiment 14, wherein the signature is returned in Distinguished Encoding Rules format.

27. A processor-implemented transaction signing system, comprising:
secure firmware transaction signing component means implemented by a first hardware security module (HSM), to:
receive, via at least one processor, a transaction signing request message for a transaction;
obtain, via at least one processor, an encrypted master private key associated with the transaction from a second HSM;
retrieve, via at least one processor, from the first HSM's tamper-proof storage, a private key decryption key associated with the first HSM;
decrypt, via at least one processor, by the first HSM, the encrypted master private key using the retrieved private key decryption key;
determine, via at least one processor, a transaction hash and a keychain path associated with the transaction signing request message;

generate, via at least one processor, by the first HSM, a signing private key for the determined keychain path using the decrypted master private key;

sign, via at least one processor, by the first HSM, the determined transaction hash using the generated signing private key to generate a signature; and return, via at least one processor, the generated signature.

28. The system of embodiment 27, wherein the first HSM is a PCIe appliance installed in a transaction signing server.

29. The system of embodiment 27, wherein the second HSM is a USB appliance communicatively coupled to the first HSM via USB.

30. The system of embodiment 27, wherein the second HSM includes a pin entry device.

31. The system of embodiment 30, wherein the second HSM provides the encrypted master private key to the first HSM upon obtaining separate credentials from a predetermined number of people.

32. The system of embodiment 27, wherein the second HSM also implements a secure firmware transaction signing component.

33. The system of embodiment 27, wherein the transaction signing request is an API call to a method exposed by the secure firmware transaction signing component.

34. The system of embodiment 27, wherein the encrypted master private key is encrypted, by the second HSM, using a public key encryption key of the first HSM stored in the second HSM's tamper-proof storage.

35. The system of embodiment 27, wherein the signing private key is generated using a Bip32-based deterministic key derivation procedure.

36. The system of embodiment 27, further, comprising:
secure firmware transaction signing component means, to:
wipe, via at least one processor, temporary private key data from the memory after generating the signature.

37. The system of embodiment 36, wherein the temporary private key data includes the encrypted master private key, the decrypted master private key, and the generated signing private key.

38. The system of embodiment 27, wherein the transaction hash is signed in accordance with the hashing algorithm utilized by the Bitcoin protocol.

39. The system of embodiment 27, wherein the signature is returned in Distinguished Encoding Rules format.

40. A processor-implemented transaction signing method, comprising:
executing processor-implemented secure firmware transaction signing component instructions implemented by a first hardware security module (HSM), to:
receive, via at least one processor, a transaction signing request message for a transaction;
obtain, via at least one processor, an encrypted master private key associated with the transaction from a second HSM;
retrieve, via at least one processor, from the first HSM's tamper-proof storage, a private key decryption key associated with the first HSM;
decrypt, via at least one processor, by the first HSM, the encrypted master private key using the retrieved private key decryption key;
determine, via at least one processor, a transaction hash and a keychain path associated with the transaction signing request message;
generate, via at least one processor, by the first HSM, a signing private key for the determined keychain path using the decrypted master private key;
sign, via at least one processor, by the first HSM, the determined transaction hash using the generated signing private key to generate a signature; and
return, via at least one processor, the generated signature.

41. The method of embodiment 40, wherein the first HSM is a PCIe appliance installed in a transaction signing server.

42. The method of embodiment 40, wherein the second HSM is a USB appliance communicatively coupled to the first HSM via USB.

43. The method of embodiment 40, wherein the second HSM includes a pin entry device.

44. The method of embodiment 43, wherein the second HSM provides the encrypted master private key to the first HSM upon obtaining separate credentials from a predetermined number of people.

45. The method of embodiment 40, wherein the second HSM also implements a secure firmware transaction signing component.

46. The method of embodiment 40, wherein the transaction signing request is an API call to a method exposed by the secure firmware transaction signing component.

47. The method of embodiment 40, wherein the encrypted master private key is encrypted, by the second HSM, using a public key encryption key of the first HSM stored in the second HSM's tamper-proof storage.

48. The method of embodiment 40, wherein the signing private key is generated using a Bip32-based deterministic key derivation procedure.

49. The method of embodiment 40, further, comprising:
executing processor-implemented secure firmware transaction signing component instructions to:
wipe, via at least one processor, temporary private key data from the memory after generating the signature.

50. The method of embodiment 49, wherein the temporary private key data includes the encrypted master private key, the decrypted master private key, and the generated signing private key.

51. The method of embodiment 40, wherein the transaction hash is signed in accordance with the hashing algorithm utilized by the Bitcoin protocol.

52. The method of embodiment 40, wherein the signature is returned in Distinguished Encoding Rules format.

101. A secure firmware key backup apparatus, comprising:
a memory;
a component collection in the memory, including:
a secure firmware key backup component implemented by a backup hardware security module (HSM);
a processor disposed in communication with the memory, and configured to issue a plurality of processing instructions from the component collection stored in the memory,
wherein the processor issues instructions from the secure firmware key backup component, stored in the memory, to:
receive, via at least one processor, by the backup HSM, a key backup request from a backup utility, wherein the key backup request includes an encrypted master key associated with a hosting HSM;
retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

102. The apparatus of embodiment 101, wherein the backup HSM is a PCIe appliance.

103. The apparatus of embodiment 101, wherein the hosting HSM is a USB appliance communicatively coupled to the backup HSM via USB.

104. The apparatus of embodiment 101, wherein the key backup request is an API call to a method exposed by the secure firmware key backup component.

105. The apparatus of embodiment 101, wherein the public key encryption key and the corresponding private key decryption key are predefined for the backup HSM.

106. The apparatus of embodiment 101, wherein the public key encryption key and the corresponding private key decryption key are generated dynamically each time a key backup is executed.

107. The apparatus of embodiment 101, wherein the secret sharing method is Shamir's Secret Sharing.

108. The apparatus of embodiment 101, further, comprising:
the processor issues instructions from the secure firmware key backup component, stored in the memory, to:
determine, via at least one processor, by the backup HSM, a specified number of master key shares sufficient to recover the master key; and
wherein the master key shares are generated using the secret sharing method based on the determined number of master key shares sufficient to recover the master key.

109. The apparatus of embodiment 101, further, comprising:
a backup utility key backup component in the component collection, and
the processor issues instructions from the backup utility key backup component, stored in the memory, to:
generate, via at least one processor, backup materials from the generated master key shares.

110. The apparatus of embodiment 109, wherein the backup materials are any of: paper printouts, metal plates, plastic plates, USB keys, hard drives, solid state drives, portable HSMs.

111. The apparatus of embodiment 109, wherein the backup materials are distributed for storage in geographically distributed backup locations.

112. The apparatus of embodiment 111, wherein each geographic backup location stores a mixture of different types of backup materials.

113. The apparatus of embodiment 101, further, comprising:
a secure firmware key recovery component in the component collection, and
the processor issues instructions from the secure firmware key recovery component, stored in the memory, to:
receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

114. The apparatus of embodiment 113, wherein the backup HSM and the second backup HSM are the same HSM.

115. The apparatus of embodiment 113, wherein the hosting HSM and the second hosting HSM are the same HSM.

116. A processor-readable secure firmware key backup non-transient physical medium storing processor-executable components, the components, comprising:
a component collection stored in the medium, including:
a secure firmware key backup component implemented by a backup hardware security module (HSM);
wherein the secure firmware key backup component, stored in the medium, includes processor-issuable instructions to:
receive, via at least one processor, by the backup HSM, a key backup request from a backup utility, wherein the key backup request includes an encrypted master key associated with a hosting HSM;

retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

117. The medium of embodiment 116, wherein the backup HSM is a PCIe appliance.

118. The medium of embodiment 116, wherein the hosting HSM is a USB appliance communicatively coupled to the backup HSM via USB.

119. The medium of embodiment 116, wherein the key backup request is an API call to a method exposed by the secure firmware key backup component.

120. The medium of embodiment 116, wherein the public key encryption key and the corresponding private key decryption key are predefined for the backup HSM.

121. The medium of embodiment 116, wherein the public key encryption key and the corresponding private key decryption key are generated dynamically each time a key backup is executed.

122. The medium of embodiment 116, wherein the secret sharing method is Shamir's Secret Sharing.

123. The medium of embodiment 116, further, comprising:
the secure firmware key backup component, stored in the medium, includes processor-issuable instructions to:

determine, via at least one processor, by the backup HSM, a specified number of master key shares sufficient to recover the master key; and
wherein the master key shares are generated using the secret sharing method based on the determined number of master key shares sufficient to recover the master key.

124. The medium of embodiment 116, further, comprising:
a backup utility key backup component in the component collection, and
the backup utility key backup component, stored in the medium, includes processor-issuable instructions to:
generate, via at least one processor, backup materials from the generated master key shares.

125. The medium of embodiment 124, wherein the backup materials are any of: paper printouts, metal plates, plastic plates, USB keys, hard drives, solid state drives, portable HSMs.

126. The medium of embodiment 124, wherein the backup materials are distributed for storage in geographically distributed backup locations.

127. The medium of embodiment 126, wherein each geographic backup location stores a mixture of different types of backup materials.

128. The medium of embodiment 116, further, comprising:
a secure firmware key recovery component in the component collection, and
the secure firmware key recovery component, stored in the medium, includes processor-issuable instructions to:
receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;
recover, via at least one processor, by the second backup HSM, the master key from the set of master key shares using the secret sharing method;
encrypt, via at least one processor, by the second backup HSM, the recovered master key using the second public key encryption key; and
provide, via at least one processor, by the second backup HSM, the encrypted recovered master key to the recovery utility.

129. The medium of embodiment 128, wherein the backup HSM and the second backup HSM are the same HSM.

130. The medium of embodiment 128, wherein the hosting HSM and the second hosting HSM are the same HSM.

131. A processor-implemented secure firmware key backup system, comprising:
a secure firmware key backup component means implemented by a backup hardware security module (HSM), to:
receive, via at least one processor, by the backup HSM, a key backup request from a backup utility, wherein the key backup request includes an encrypted master key associated with a hosting HSM;
retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;
decrypt, via at least one processor, by the backup HSM, the encrypted master key using the retrieved private key decryption key;
determine, via at least one processor, by the backup HSM, a specified number of master key shares to generate for the decrypted master key;
generate, via at least one processor, by the backup HSM, the specified number of master key shares using a secret sharing method; and
provide, via at least one processor, by the backup HSM, the generated master key shares to the backup utility.

132. The system of embodiment 131, wherein the backup HSM is a PCIe appliance.

133. The system of embodiment 131, wherein the hosting HSM is a USB appliance communicatively coupled to the backup HSM via USB.

134. The system of embodiment 131, wherein the key backup request is an API call to a method exposed by the secure firmware key backup component.

135. The system of embodiment 131, wherein the public key encryption key and the corresponding private key decryption key are predefined for the backup HSM.

136. The system of embodiment 131, wherein the public key encryption key and the corresponding private key decryption key are generated dynamically each time a key backup is executed.

137. The system of embodiment 131, wherein the secret sharing method is Shamir's Secret Sharing.

138. The system of embodiment 131, further, comprising:
the secure firmware key backup component means, to:
determine, via at least one processor, by the backup HSM, a specified number of master key shares sufficient to recover the master key; and
wherein the master key shares are generated using the secret sharing method based on the determined number of master key shares sufficient to recover the master key.

139. The system of embodiment 131, further, comprising:
a backup utility key backup component means, to:
generate, via at least one processor, backup materials from the generated master key shares.

140. The system of embodiment 139, wherein the backup materials are any of: paper printouts, metal plates, plastic plates, USB keys, hard drives, solid state drives, portable HSMs.

141. The system of embodiment 139, wherein the backup materials are distributed for storage in geographically distributed backup locations.

142. The system of embodiment 141, wherein each geographic backup location stores a mixture of different types of backup materials.

143. The system of embodiment 131, further, comprising:
a secure firmware key recovery component means, to:
receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

144. The system of embodiment 143, wherein the backup HSM and the second backup HSM are the same HSM.

145. The system of embodiment 143, wherein the hosting HSM and the second hosting HSM are the same HSM.

146. A processor-implemented secure firmware key backup method, comprising:

executing processor-implemented secure firmware key backup component instructions to:

receive, via at least one processor, by the backup HSM, a key backup request from a backup utility, wherein the key backup request includes an encrypted master key associated with a hosting HSM;

retrieve, via at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via at least one processor, by the backup HSM, the encrypted master key using the retrieved private key decryption key;

determine, via at least one processor, by the backup HSM, a specified number of master key shares to generate for the decrypted master key;

generate, via at least one processor, by the backup HSM, the specified number of master key shares using a secret sharing method; and provide, via at least one processor, by the backup HSM, the generated master key shares to the backup utility.

147. The method of embodiment 146, wherein the backup HSM is a PCIe appliance.

148. The method of embodiment 146, wherein the hosting HSM is a USB appliance communicatively coupled to the backup HSM via USB.

149. The method of embodiment 146, wherein the key backup request is an API call to a method exposed by the secure firmware key backup component.

150. The method of embodiment 146, wherein the public key encryption key and the corresponding private key decryption key are predefined for the backup HSM.

151. The method of embodiment 146, wherein the public key encryption key and the corresponding private key decryption key are generated dynamically each time a key backup is executed.

152. The method of embodiment 146, wherein the secret sharing method is Shamir's Secret Sharing.

153. The method of embodiment 146, further, comprising:

executing processor-implemented secure firmware key backup component instructions to:

determine, via at least one processor, by the backup HSM, a specified number of master key shares sufficient to recover the master key; and wherein the master key shares are generated using the secret sharing method based on the determined number of master key shares sufficient to recover the master key.

154. The method of embodiment 146, further, comprising:

executing processor-implemented backup utility key backup component instructions to:

generate, via at least one processor, backup materials from the generated master key shares.

155. The method of embodiment 154, wherein the backup materials are any of: paper printouts, metal plates, plastic plates, USB keys, hard drives, solid state drives, portable HSMs.

156. The method of embodiment 154, wherein the backup materials are distributed for storage in geographically distributed backup locations.

157. The method of embodiment 156, wherein each geographic backup location stores a mixture of different types of backup materials.

158. The method of embodiment 146, further, comprising:

executing processor-implemented secure firmware key recovery component instructions to:

receive, via at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;

recover, via at least one processor, by the second backup HSM, the master key from the set of master key shares using the secret sharing method;

encrypt, via at least one processor, by the second backup HSM, the recovered master key using the second public key encryption key; and provide, via at least one processor, by the second backup HSM, the encrypted recovered master key to the recovery utility.

159. The method of embodiment 158, wherein the backup HSM and the second backup HSM are the same HSM.

160. The method of embodiment 158, wherein the hosting HSM and the second hosting HSM are the same HSM.

In order to address various issues and advance the art, the entirety of this application for Firmware Extension for Secure Cryptocurrency Key Backup, Restore, and Transaction Signing Platform Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SFTSP individual and/or enterprise user, database configuration and/or relational model, data type, data transmission and/or network framework, syntax structure, and/or the like, various embodiments of the SFTSP, may be implemented that enable a great deal of flexibility and customization. For example, aspects of the SFTSP may be adapted for non-Bitcoin transactions. While various embodiments and discussions of the SFTSP have included information technology, however, it is to be understood that the embodiments described herein may be readily configured and/or customized for a wide variety of other applications and/or implementations.

What is claimed is:

1. A secure firmware key backup apparatus, comprising:
a memory;
a component collection in the memory, including:
a secure firmware key backup component implemented by a backup hardware security module (HSM), wherein the backup HSM is a PCIe appliance;
at least one processor disposed in communication with the memory, and configured to issue a plurality of processing instructions from the component collection stored in the memory,
wherein the at least one processor issues instructions from the secure firmware key backup component, stored in the memory, to:
receive, via the at least one processor, by the backup HSM, a key backup request from a backup utility, wherein the key backup request includes an encrypted master key associated with a hosting HSM, wherein the hosting HSM is a USB appliance communicatively coupled to the backup HSM via USB;
retrieve, via the at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;
decrypt, via the at least one processor, by the backup HSM, the encrypted master key using the retrieved private key decryption key;
determine, via the at least one processor, by the backup HSM, a specified number of master key shares to generate for the decrypted master key;
generate, via the at least one processor, by the backup HSM, the specified number of master key shares using a secret sharing method; and
provide, via the at least one processor, by the backup HSM, the generated master key shares to the backup utility.

2. The apparatus of claim 1, wherein the key backup request is an API call to a method exposed by the secure firmware key backup component.

3. The apparatus of claim 1, wherein the public key encryption key and the corresponding private key decryption key are predefined for the backup HSM.

4. The apparatus of claim 1, wherein the public key encryption key and the corresponding private key decryption key are generated dynamically each time a key backup is executed.

5. The apparatus of claim 1, wherein the secret sharing method is Shamir's Secret Sharing.

6. The apparatus of claim 1, further, comprising:
the at least one processor issues instructions from the secure firmware key backup component, stored in the memory, to:
determine, via the at least one processor, by the backup HSM, a specified number of master key shares sufficient to recover the master key; and
wherein the master key shares are generated using the secret sharing method based on the determined number of master key shares sufficient to recover the master key.

7. The apparatus of claim 1, further, comprising:
a backup utility key backup component in the component collection, and
the at least one processor issues instructions from the backup utility key backup component, stored in the memory, to:
generate, via the at least one processor, backup materials from the generated master key shares.

8. The apparatus of claim 7, wherein the backup materials are any of: paper printouts, metal plates, plastic plates, USB keys, hard drives, solid state drives, portable HSMs.

9. The apparatus of claim 7, wherein the backup materials are distributed for storage in geographically distributed backup locations.

10. The apparatus of claim 9, wherein each geographic backup location stores a mixture of different types of backup materials.

11. The apparatus of claim 1, further, comprising:
a secure firmware key recovery component in the component collection, and
the at least one processor issues instructions from the secure firmware key recovery component, stored in the memory, to:
receive, via the at least one processor, by a second backup HSM, a key recovery request from a recovery utility, wherein the key recovery request includes a set of master key shares sufficient to recover the master key, wherein the key recovery request includes a second public key encryption key provided by a second hosting HSM, wherein the second public key encryption key corresponds to a second private key decryption key stored in tamper-proof storage of the second hosting HSM;
recover, via the at least one processor, by the second backup HSM, the master key from the set of master key shares using the secret sharing method;
encrypt, via the at least one processor, by the second backup HSM, the recovered master key using the second public key encryption key; and
provide, via the at least one processor, by the second backup HSM, the encrypted recovered master key to the recovery utility.

12. The apparatus of claim 11, wherein the backup HSM and the second backup HSM are the same HSM.

13. The apparatus of claim 11, wherein the hosting HSM and the second hosting HSM are the same HSM.

14. A processor-readable secure firmware key backup non-transient physical medium storing processor-executable components, the components, comprising:
a component collection stored in the medium, including:
a secure firmware key backup component implemented by a backup hardware security module (HSM), wherein the backup HSM is a PCIe appliance;
wherein the secure firmware key backup component, stored in the medium, includes processor-issuable instructions to:
receive, via at least one processor, by the backup HSM, a key backup request from a backup utility, wherein the key backup request includes an encrypted master key associated with a hosting HSM, wherein the hosting HSM is a USB appliance communicatively coupled to the backup HSM via USB;
retrieve, via the at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;
decrypt, via the at least one processor, by the backup HSM, the encrypted master key using the retrieved private key decryption key;
determine, via the at least one processor, by the backup HSM, a specified number of master key shares to generate for the decrypted master key;
generate, via the at least one processor, by the backup HSM, the specified number of master key shares using a secret sharing method; and
provide, via the at least one processor, by the backup HSM, the generated master key shares to the backup utility.

15. A processor-implemented secure firmware key backup system, comprising:
a secure firmware key backup component implemented by a backup hardware security module (HSM), wherein the backup HSM is a PCIe appliance configured to:
receive, via at least one processor, by the backup HSM, a key backup request from a backup utility, wherein the key backup request includes an encrypted master key associated with a hosting HSM, wherein the hosting HSM is a USB appliance communicatively coupled to the backup HSM via USB;
retrieve, via the at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;
decrypt, via the at least one processor, by the backup HSM, the encrypted master key using the retrieved private key decryption key;
determine, via the at least one processor, by the backup HSM, a specified number of master key shares to generate for the decrypted master key;
generate, via the at least one processor, by the backup HSM, the specified number of master key shares using a secret sharing method; and
provide, via the at least one processor, by the backup HSM, the generated master key shares to the backup utility.

16. A processor-implemented secure firmware key backup method, comprising:
executing processor-implemented secure firmware key backup component instructions by a backup hardware security module (HSM), wherein the backup HSM is a PCIe appliance configured to:
receive, via at least one processor, by the backup HSM, a key backup request from a backup utility, wherein the key backup request includes an encrypted master key associated with a hosting HSM, wherein the hosting HSM is a USB appliance communicatively coupled to the backup HSM via USB;
retrieve, via the at least one processor, from the backup HSM's tamper-proof storage, a private key decryption key corresponding to a public key encryption key previously provided by the backup HSM to the backup utility for the hosting HSM, wherein the encrypted master key is encrypted using the public key encryption key by the hosting HSM;

decrypt, via the at least one processor, by the backup HSM, the encrypted master key using the retrieved private key decryption key;

determine, via the at least one processor, by the backup HSM, a specified number of master key shares to generate for the decrypted master key;

generate, via the at least one processor, by the backup HSM, the specified number of master key shares using a secret sharing method; and provide, via the at least one processor, by the backup HSM, the generated master key shares to the backup utility.

* * * * *